(12) United States Patent
Shehab et al.

(10) Patent No.: US 11,045,985 B2
(45) Date of Patent: Jun. 29, 2021

(54) SELF-HOLDING AND SELF-EXTRACTING SEAL MOLDING SYSTEM AND METHOD

(71) Applicant: The Boeing Company, Chicago, IL (US)

(72) Inventors: Kareem Gamal Eldin Shehab, Seattle, WA (US); Donald W. Coffland, Seattle, WA (US)

(73) Assignee: The Boeing Company, Chicago, IL (US)

( * ) Notice: Subject to any disclaimer, the term of this patent is extended or adjusted under 35 U.S.C. 154(b) by 209 days.

(21) Appl. No.: 16/053,593

(22) Filed: Aug. 2, 2018

(65) Prior Publication Data

US 2020/0039127 A1    Feb. 6, 2020

(51) Int. Cl.
*B29C 45/14* (2006.01)
*B29C 45/26* (2006.01)
(Continued)

(52) U.S. Cl.
CPC ........ *B29C 45/14336* (2013.01); *B29C 45/26* (2013.01); *B29C 2045/14459* (2013.01);
(Continued)

(58) Field of Classification Search
CPC ........ B29C 45/14336; B29C 45/14418; B29C 45/14459; B29C 2045/14459; B29C 2045/14606; B29C 2045/1718; B29C 2045/1725; B29C 2045/1741; B29C 2045/2761; B29C 2045/2762;
(Continued)

(56) References Cited

U.S. PATENT DOCUMENTS 2,892,013 A    6/1959 Gomberg et al.
3,063,097 A *  11/1962 Jutzi ...................... B29C 43/027
                                                   29/33 R
(Continued)

FOREIGN PATENT DOCUMENTS

DE    19503346    8/1996
DE    19728234    3/1999
(Continued)

OTHER PUBLICATIONS

Rosato, Injection Molding Handbook, 3rd ed., Springer Science+Business Media, New York, 2000.

*Primary Examiner* — Seyed Masoud Malekzadeh

(57) ABSTRACT

A seal molding system includes a mold body having a mold body inner geometry configured complementary to a fitting outer geometry of a fitting, and a mold collar having one or more mold collar engagement elements configured to engage with one or more fitting engagement elements. The mold collar is couplable to the mold body at a body-collar interface allowing free rotation of the mold collar relative to the mold body. The body-collar interface is configured such that axial motion in a first axial direction and/or rotational motion in a first rotational direction of the mold collar relative to the fitting causes the mold collar to urge the mold body against a panel surface, and axial motion in a second axial direction and/or rotational motion in a second rotational direction of the mold collar relative to the fitting causes the mold collar to draw the mold body away from the panel.

24 Claims, 24 Drawing Sheets

(51) Int. Cl.
  *B29L 31/30* (2006.01)
  *B29L 31/26* (2006.01)
(52) U.S. Cl.
  CPC ....... *B29K 2827/18* (2013.01); *B29L 2031/26* (2013.01); *B29L 2031/3082* (2013.01)
(58) Field of Classification Search
  CPC ........ B29C 2045/2889; B29C 33/0077; B29C 33/0038; B29C 45/26; B29C 45/2681; B29C 45/14598; B29C 33/30; B29C 39/10; B29L 2031/26
  See application file for complete search history.

(56) References Cited

U.S. PATENT DOCUMENTS

| | | | |
|---|---|---|---|
| 3,692,457 A | 9/1972 | Pekor et al. | |
| 3,754,846 A * | 8/1973 | Choate | B29C 45/14 425/125 |
| 3,798,586 A | 3/1974 | Huska | |
| 4,090,294 A | 5/1978 | Parr | |
| 4,134,431 A | 1/1979 | Davidson et al. | |
| 4,371,145 A | 2/1983 | Barnes | |
| 4,382,049 A | 5/1983 | Hofmeister et al. | |
| 4,971,745 A | 11/1990 | Ferenc et al. | |
| 5,226,837 A | 7/1993 | Cinibulk et al. | |
| 9,259,865 B2 | 2/2016 | Coffland | |
| 9,993,952 B2 | 6/2018 | Coffland | |
| 2003/0067162 A1 * | 4/2003 | Welsh | B29C 45/1459 285/305 |
| 2003/0071421 A1 | 4/2003 | Obuhowich | |
| 2003/0098287 A1 * | 5/2003 | Taber | B29C 45/14 215/352 |
| 2004/0245207 A1 * | 12/2004 | Chomik | B65D 53/02 215/343 |
| 2010/0310803 A1 | 12/2010 | Wallace | |
| 2010/0330224 A1 | 12/2010 | Hung | |
| 2012/0217673 A1 | 8/2012 | Hutter | |
| 2014/0261994 A1 * | 9/2014 | Coffland | B29C 45/14598 156/245 |
| 2015/0086295 A1 * | 3/2015 | Cameron | F16B 21/04 411/429 |
| 2016/0136857 A1 * | 5/2016 | Coffland | B29C 33/0077 425/500 |
| 2018/0340642 A1 * | 11/2018 | Quesada | F16L 47/08 |
| 2018/0372040 A1 * | 12/2018 | French | F02M 35/10354 |

FOREIGN PATENT DOCUMENTS

| | | |
|---|---|---|
| DE | 19949471 | 5/2001 |
| GB | 958367 | 5/1964 |
| JP | 58128830 | 8/1983 |
| JP | 04071102 | 3/1992 |
| WO | WO2009129657 | 10/2009 |
| WO | WO2012150897 | 11/2012 |

* cited by examiner

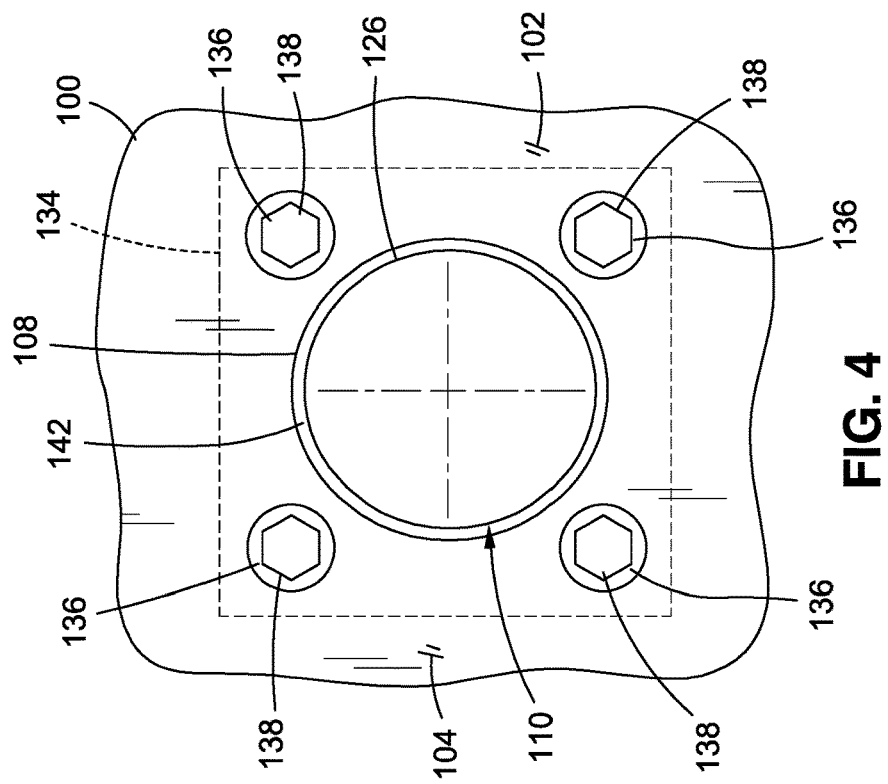
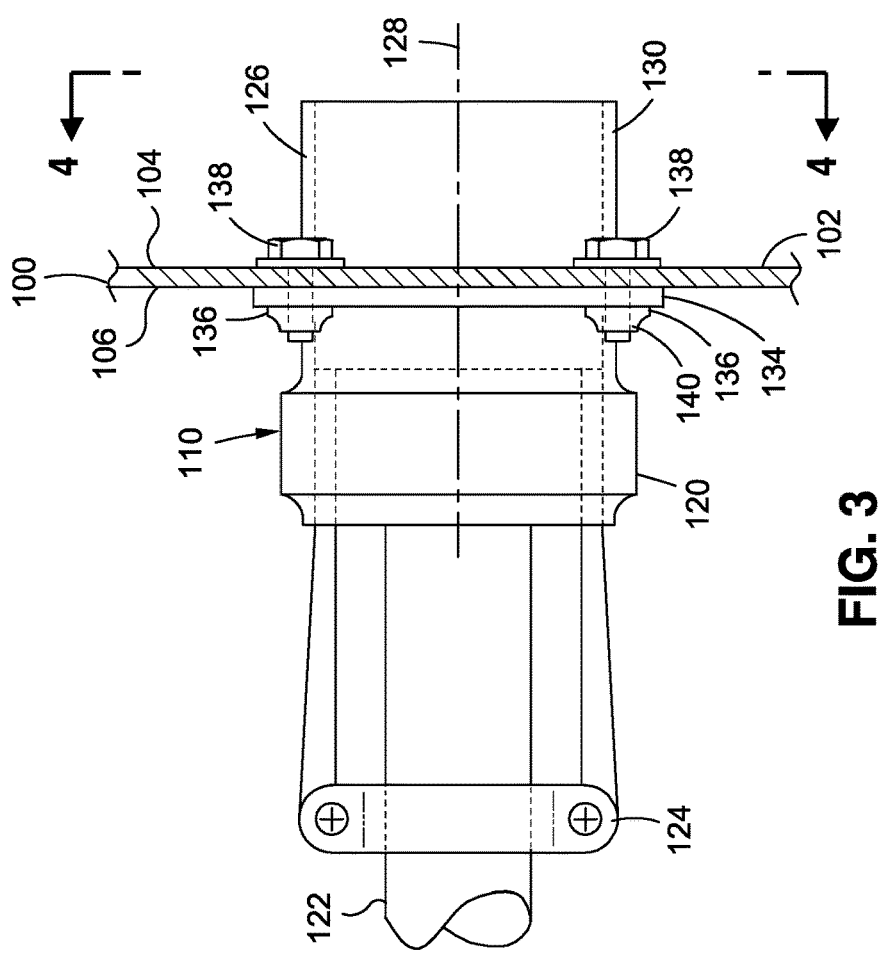

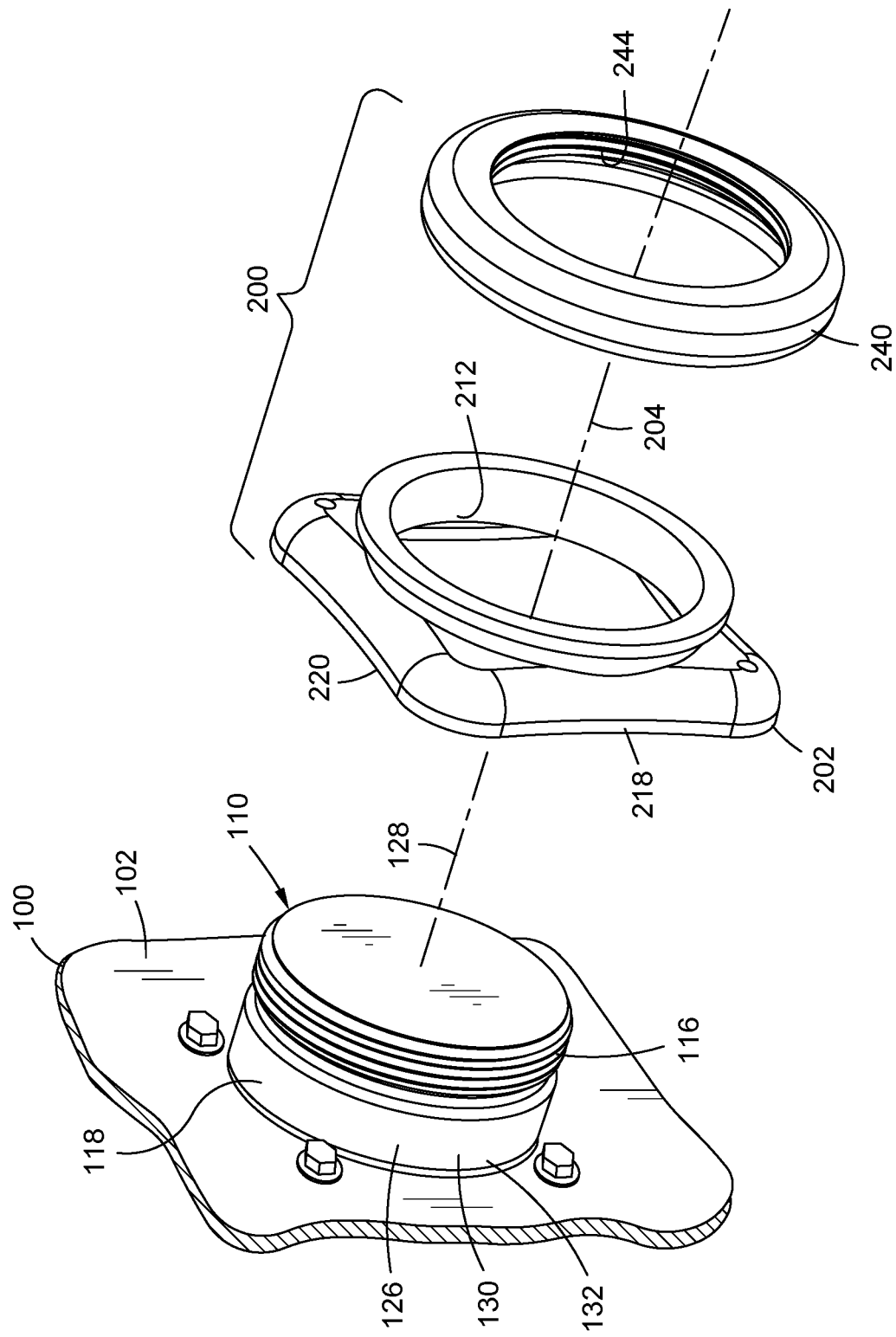

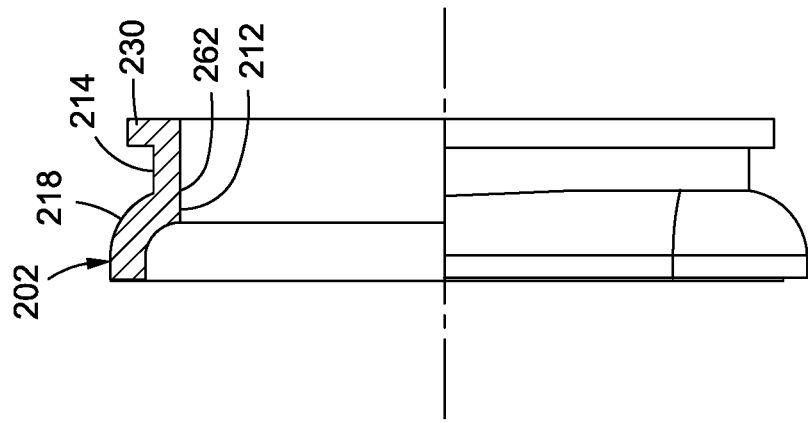
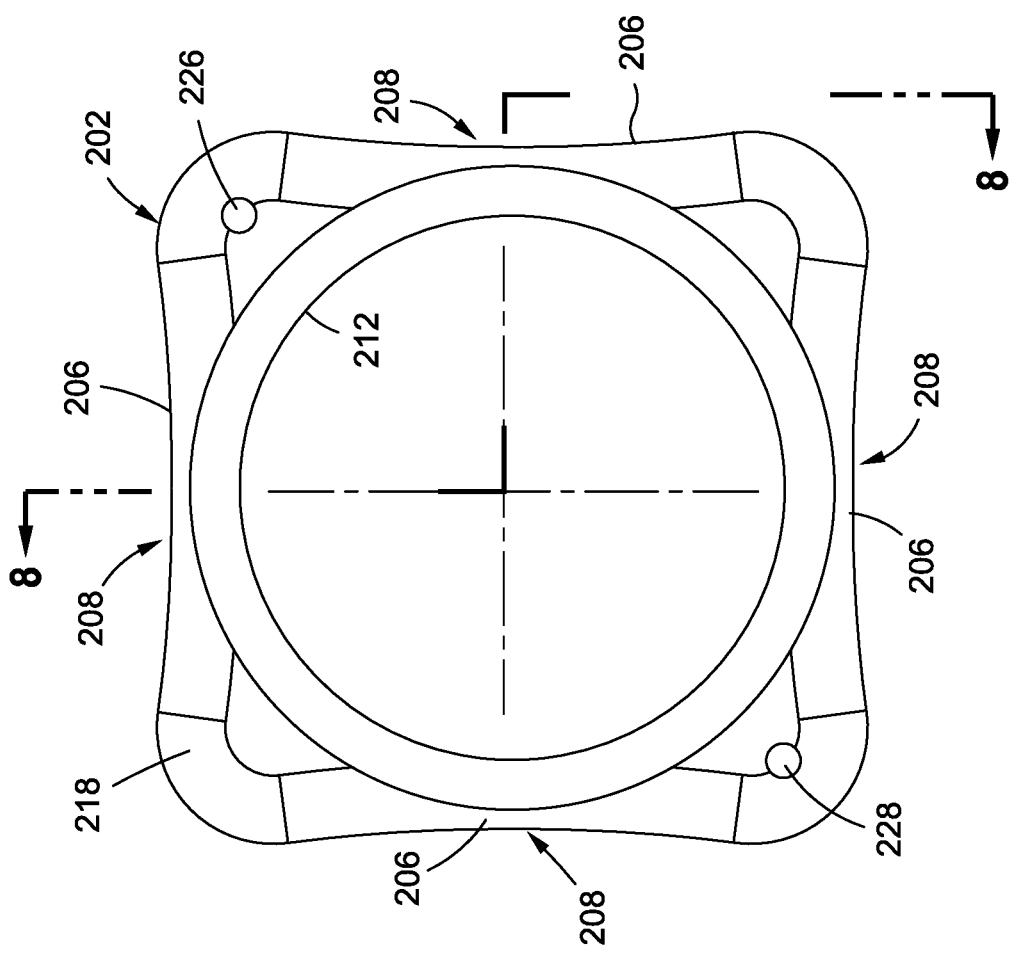

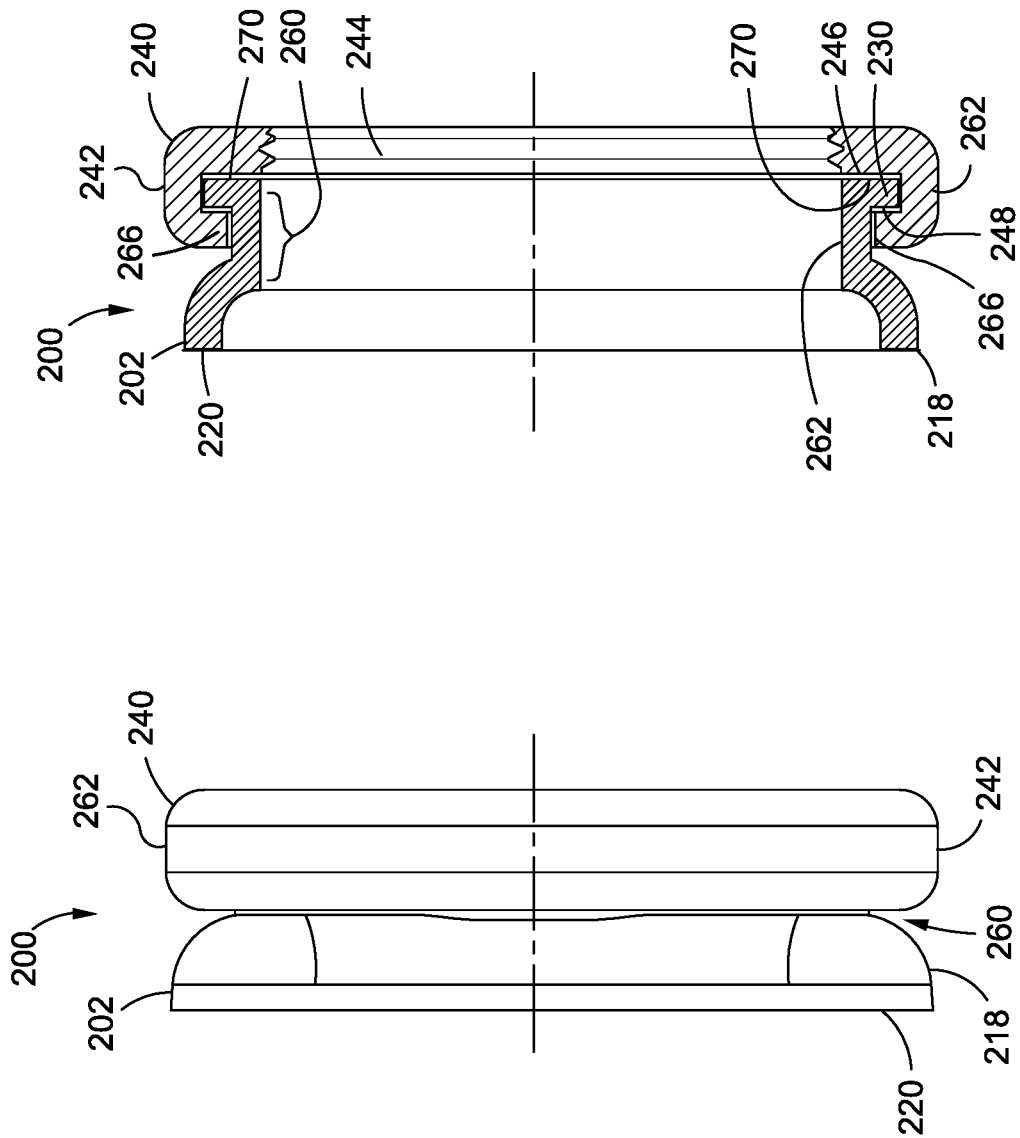

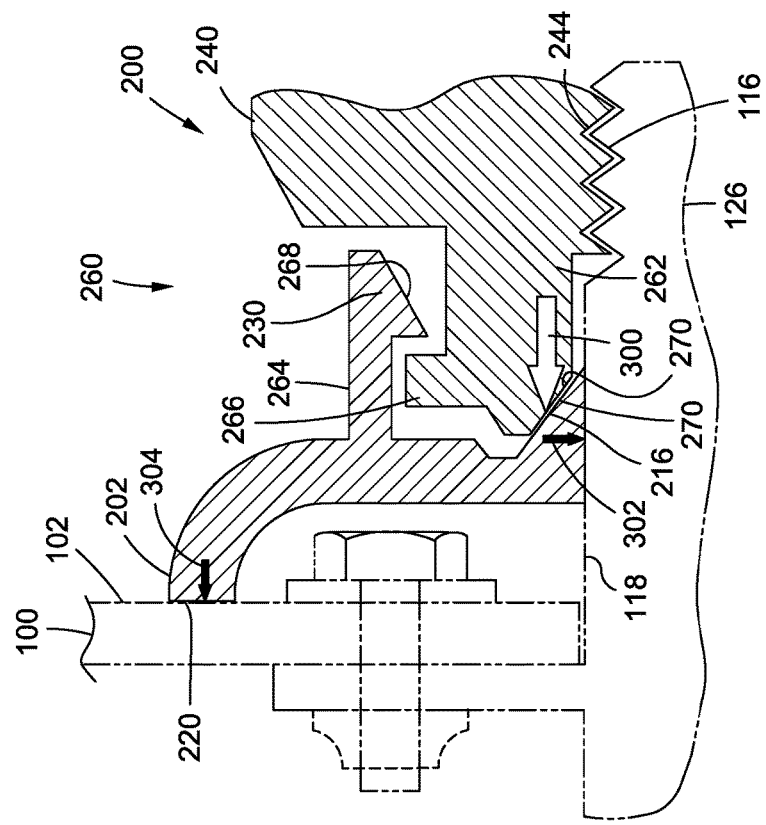
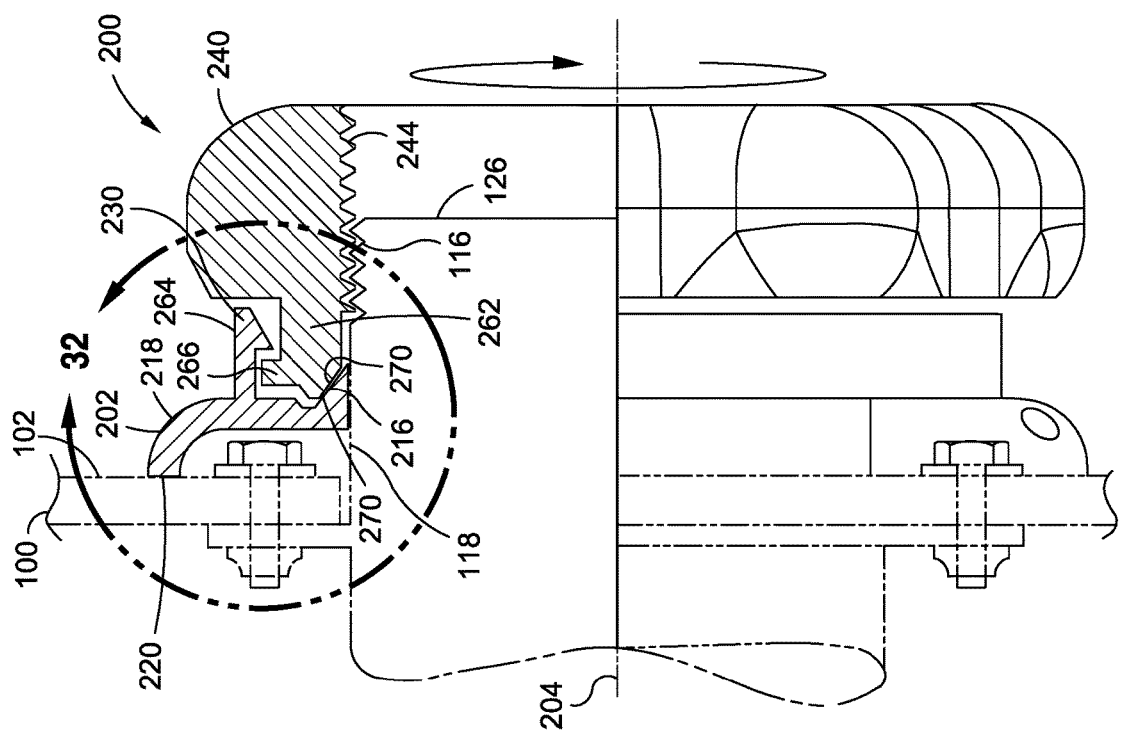
FIG. 32
FIG. 31

SELF-HOLDING AND SELF-EXTRACTING SEAL MOLDING SYSTEM AND METHOD

FIELD

The present disclosure relates generally to sealing systems and, more particularly, to a self-holding and self-extracting seal forming system and method for forming a seal around a fitting mounted to a panel or other member.

BACKGROUND

Electrical connectors are installed at numerous locations throughout an aircraft. An electrical connector may be mounted to a panel or a bulkhead of an aircraft by extending a front portion of the connector body through an aperture or hole formed in the panel. The electrical connector may be secured to the panel by fastening a fitting flange to the panel. On certain electrical connector installations, it is necessary to form a seal around a front portion of the connector body and against the panel surface to provide a barrier against fluid transfer across the panel and/or to protect the connector and panel against corrosion.

Prior art methods of sealing electrical connectors to a panel include the manual application of sealant around the connector body and against the panel surface. Unfortunately, the manual application of sealant is a laborious and time-consuming process which produces a rough surface finish and inconsistent results. Prior art methods that use multi-part molds for forming a seal around a connector body require the use of clamping devices to hold the multi-part molds in position around the connector during the injection and curing of sealant. However, the installation of clamping devices may be time-consuming. In confined areas, the installation of clamping devices may not be possible. In addition, the separation of the multi-part molds from the cured seal may be difficult due to stiction between the cured seal and the inner mold surfaces.

As can be seen, there exists a need in the art for a seal molding system and method for forming a seal around a fitting in a time-efficient manner and which results in a smooth surface finish that can be consistently reproduced at multiple fitting installations. The seal molding system and method preferably avoids the use of clamping devices and preferably facilitates the removal of the seal molding system from the cured seal.

SUMMARY

The above-noted needs associated with forming a seal around a fitting are specifically addressed by the present disclosure which provides a seal molding system having a mold body and a mold collar. The mold body has a mold body inner geometry configured complementary to a fitting outer geometry of a fitting. The mold body has a mold body perimeter edge. The mold collar has one or more mold collar engagement elements configured to engage with one or more fitting engagement elements of the fitting. The mold collar is configured to be coupled to the mold body at a body-collar interface configured to retain the mold collar with the mold body and allow free rotation of the mold collar relative to the mold body during engagement of the one or more mold collar engagement elements with the one or more fitting engagement elements. The body-collar interface is configured such that a combination of axial motion in a first axial direction and rotational motion in a first rotational direction of the mold collar relative to the fitting causes the mold collar to urge the mold body against a panel surface, and a combination of axial motion in a second axial direction and rotational motion in a second rotational direction of the mold collar relative to the fitting causes the mold collar to draw the mold body away from the panel. The mold body has an injection hole for injecting sealant into a mold cavity collectively defined by the mold body inner geometry, the fitting outer geometry, and the panel surface.

In a further embodiment, disclosed is a seal molding system having a mold body having a mold body inner geometry configured complementary to a fitting outer geometry of a fitting. The mold collar has a mold collar threaded portion configured to be threadably engaged to a fitting threaded portion of the fitting. The mold collar is configured to be coupled to the mold body at a body-collar interface configured to retain the mold collar with the mold body and allow free rotation of the mold collar relative to the mold body during rotation of the mold collar threaded portion relative to the fitting threaded portion. The body-collar interface is configured such that when the mold collar is rotated in a first rotational direction and/or axially moved in a first axial direction, the mold collar urges the mold body against a panel surface, and when the mold collar is rotated in a second rotational direction and/or axially moved in a second axial direction, the mold collar draws the mold body away from the panel.

Also disclosed is a method of forming a seal around a fitting mounted to a panel. The method includes installing a mold body on the fitting. The mold body has a mold body inner geometry configured complementary to a fitting outer geometry of a fitting. The method also includes engaging one or more mold collar engagement elements of a mold collar to one or more fitting engagement elements of the fitting. The method additionally includes moving the mold collar in a combination of axial motion in a first axial direction and rotational motion in a first rotational direction to cause the mold collar to urge the mold body perimeter edge against a panel surface. The method includes injecting sealant into an injection hole in the mold body for filling a mold cavity enclosed by the mold body inner geometry, the fitting outer geometry, and the panel surface. The method also includes allowing the sealant to cure into a seal, and moving the mold collar in a combination of axial motion in a second axial direction and rotational motion in a second rotational direction to cause the mold collar to draw the mold body away from the panel to expose the seal.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 3 is a side view of the fitting installation taken along line 3-3 of FIG. 2;

FIG. 4 is an end view of the fitting installation taken along line 4-4 of FIG. 3;

FIG. 5 is a front perspective view of a fitting installation of a seal molding system separated from the fitting and having a mold body and a mold collar in a disassembled state in accordance with one example embodiment;

FIG. 7 is a top view of the mold body of FIG. 5;

FIG. 8 is a partial sectional view of the mold body taken along line 8-8 of FIG. 7;

FIG. 12 is a side view of the seal molding system taken along line 12-12 of FIG. 11;

FIG. 13 is a sectional view of the seal molding system taken along line 13-13 of FIG. 11;

FIG. 31 is a partial sectional view of a seal molding system installed on a fitting in accordance with a further example embodiment;

FIG. 32 is a magnified view of a portion of the seal molding system of encircled region identified by reference numeral 32 of FIG. 31;

DETAILED DESCRIPTION

Figure 2:
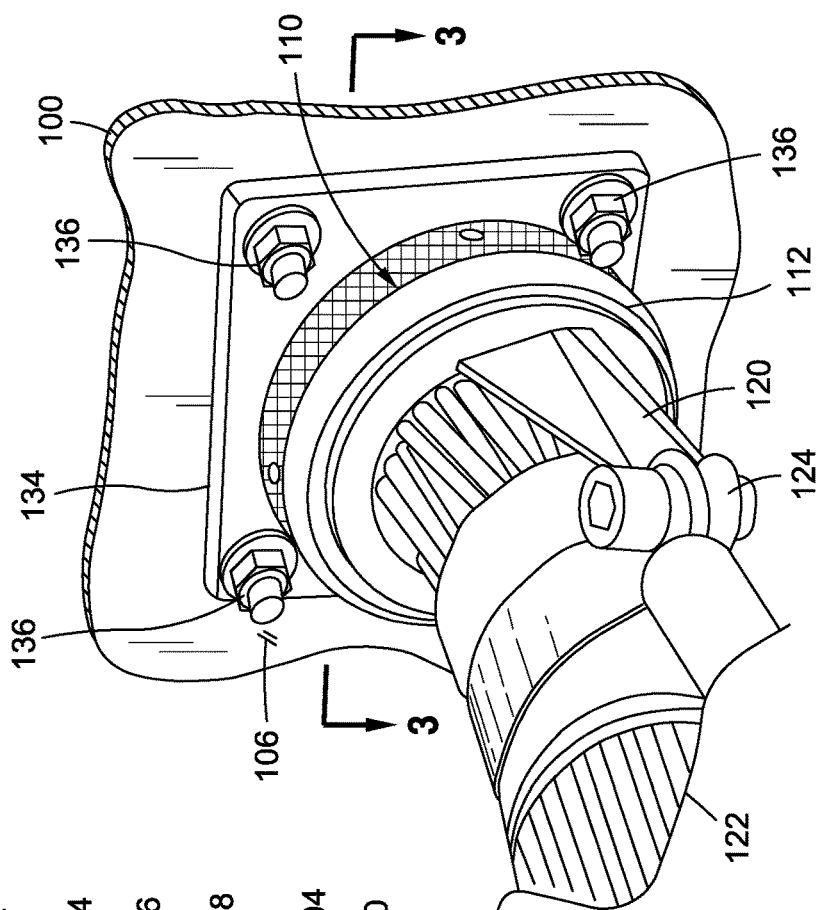
FIG. 2 is a perspective view of a back side of the fitting installation of FIG. 1.
Figure 1:
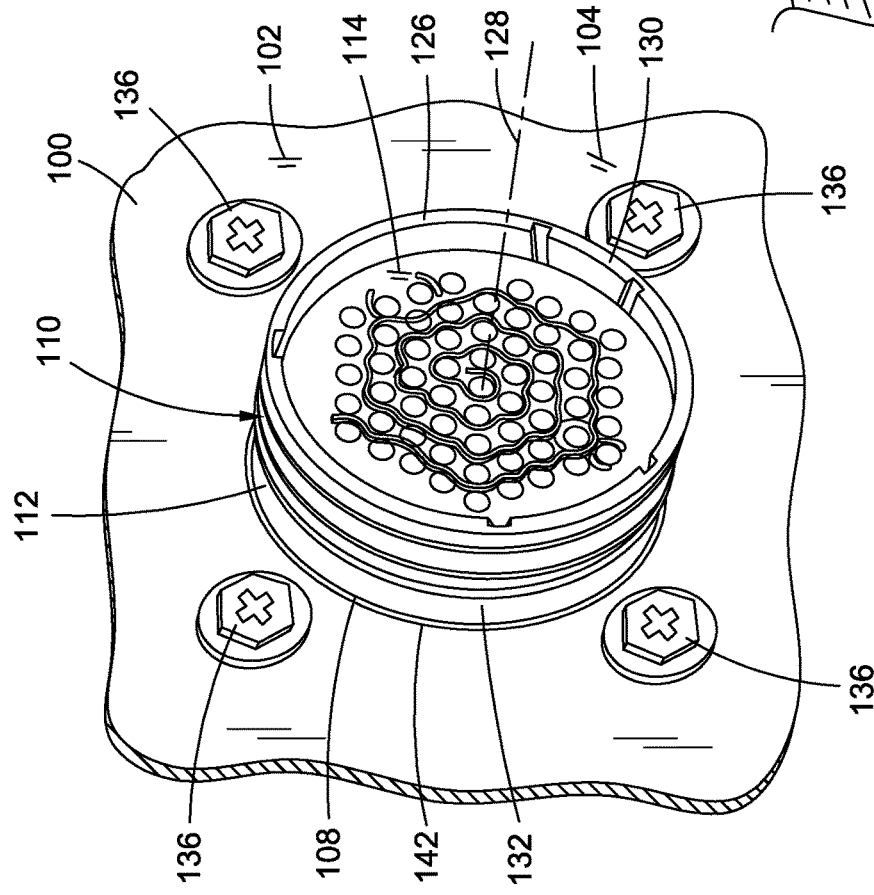
FIG. 1 is a perspective view of a front side of an example of a fitting (e.g., an electrical connector) installation to a panel.

Referring now to the drawings for purposes of illustrating preferred and various embodiments of the disclosure, shown in FIGS. 1-2 are perspective views of an example of a fitting 110 mounted to a panel 100. In the presently-disclosed seal molding system 200 (FIGS. 5-35) and method 500 (FIG. 36), the fitting 110 (FIGS. 1-5, 11, 15-17, 19-20 and 31-35) is configured as an electrical connector 112 having a connector plug 114 and a fitting engagement portion 115 (see, e.g., FIG. 5) for coupling the fitting 110 to a mating electrical connector (not shown). However, the seal molding system 200 and method 500 may be implemented for forming a seal 400 (e.g., FIG. 19) around any one a variety of different types of fittings mounted to any one of a variety of different types of structures (see, e.g., FIGS. 33-35), and is not limited to forming a seal 400 around an electrical connector 112 mounted to a panel 100.

In FIGS. 1-2, the panel 100 includes a panel hole 108 through which a fitting body 126 of a fitting 110 protrudes on a front side 104 of the panel 100. The fitting 110 includes a fitting base 132 having a fitting flange 134 which is shown positioned against a back side 106 of the panel 100. The fitting flange 134 may be secured to the panel 100 using a plurality of flange fasteners 136. The fitting body 126 has a fitting axis 128 (FIG. 1) and includes a fitting outer geometry 130 which, in the example shown, is made up of the fitting engagement portion 115 (FIG. 5) and a fitting non-engagement portion 118 (see, e.g., FIG. 5). The fitting non-engagement portion 118 may be located adjacent to the fitting flange 134, although when the fitting 110 is installed in the panel 100, the fitting non-engagement portion 118 protrudes through the panel 100 to the front side 104, while the fitting flange 134 may be positioned against the back side 106. The fitting non-engagement portion 118 may be devoid of surface features. FIG. 2 shows a fitting 110 backshell 120 located on the back side 106 of the panel 100. The backshell 120 may include a cable clamp 124 for holding a cable 122 or wire bundle which may extend from the connector plug 114 located inside the fitting body 126 on the front side 104 of the panel 100.

Referring to FIGS. 3-4, shown in FIG. 3 is a side view of the fitting 110 illustrating the flange fasteners 136 securing the fitting flange 134 to the panel 100. Also shown is the backshell 120 and cable clamp 124 for holding the cable 122 in position relative to the fitting 110. Although the fitting flange 134 is shown mounted against the back side 106 of the panel 100, the fitting flange 134 may alternatively be mounted against the front side 104 of the panel 100.

Figure 16:
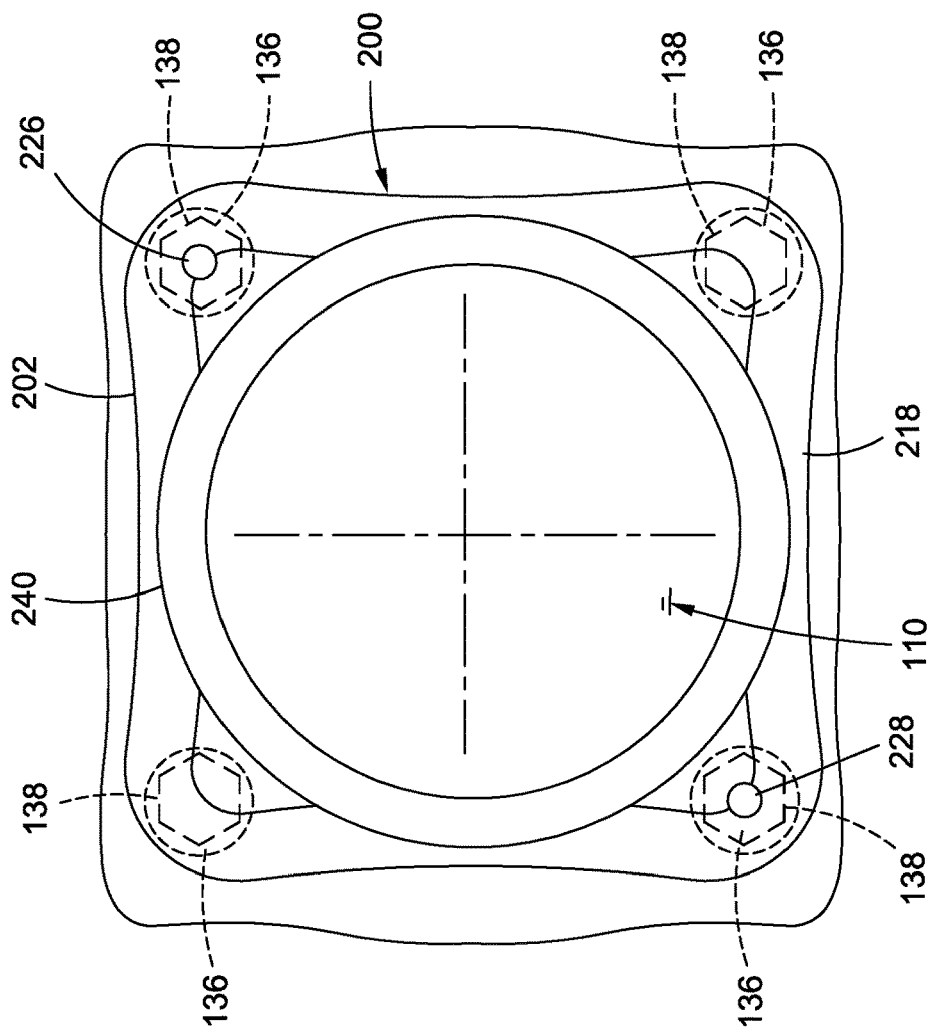
FIG. 16 is a top view of the seal molding system taken along line 16-16 of FIG. 15.

FIG. 4 is an end view of the fitting 110 installation showing the fitting body 126 protruding through a panel hole 108. As mentioned above and described in greater detail below, the presently-disclosed seal molding system 200 and method 500 provides a means for forming a seal 400 (FIG. 19) around the fitting 110. The seal 400 formed by the seal molding system 200 seals a circumferential gap 142 between the fitting body 126 and the panel hole 108. The mold body inner geometry 210 (FIG. 6) may be configured to enclose (e.g., within a mold cavity 222—FIG. 15) the fastener heads 138 or fastener receptacles 140 of a plurality of flange fasteners 136 securing the fitting flange 134 to the panel 100. For example, FIG. 16 illustrates the mold body 202 covering the fastener heads 138 of the flange fasteners 136 and contacting the panel surface 102. For an embodiment not shown in which the fitting flange 134 is mounted to the front side 104 of the panel 100, the mold body inner geometry 210 (FIG. 6) may be configured to enclose the fitting flange 134 such that the seal 400 extends over the perimeter edges of the fitting flange 134 in addition to covering the flange fasteners 136 securing the fitting flange 134 to the panel surface 102.

FIG. 5 is a front perspective view of an example of the presently-disclosed seal molding system 200 for forming a seal 400 (FIG. 19) around a fitting 110 mounted to a panel 100. The fitting 110 has a fitting engagement portion 115 configured as a fitting threaded portion 116. The seal molding system 200 includes a mold body 202 and a mold collar 240 which are shown in a disassembled state. The mold body 202 may be of one-piece construction and includes a mold body base portion 218 having a mold body perimeter edge 220 which may be configured complementary to the panel surface 102. In addition, the mold body 202 has a mold body bore 212 configured complementary to the fitting outer geometry 130 (e.g., at the fitting engagement portion 115) of the fitting body 126. The mold collar 240 may also be of one-piece construction.

The mold collar 240 has one or more mold collar engagement elements 243 configured to engage with one or more fitting engagement elements 117 of the fitting 110. For example, in FIGS. 5-32, the mold collar 240 has a mold collar engagement element 243 configured as a mold collar threaded portion 244. The mold collar threaded portion 244 is configured to be threadably engaged to a fitting engagement element 117 configured as a fitting threaded portion 116. As described in greater detail below, the mold collar 240 is configured to be coupled to the mold body 202 at a body-collar interface 260 (FIG. 13) collectively defined by the mold body 202 and the mold collar 240.

Figure 6:
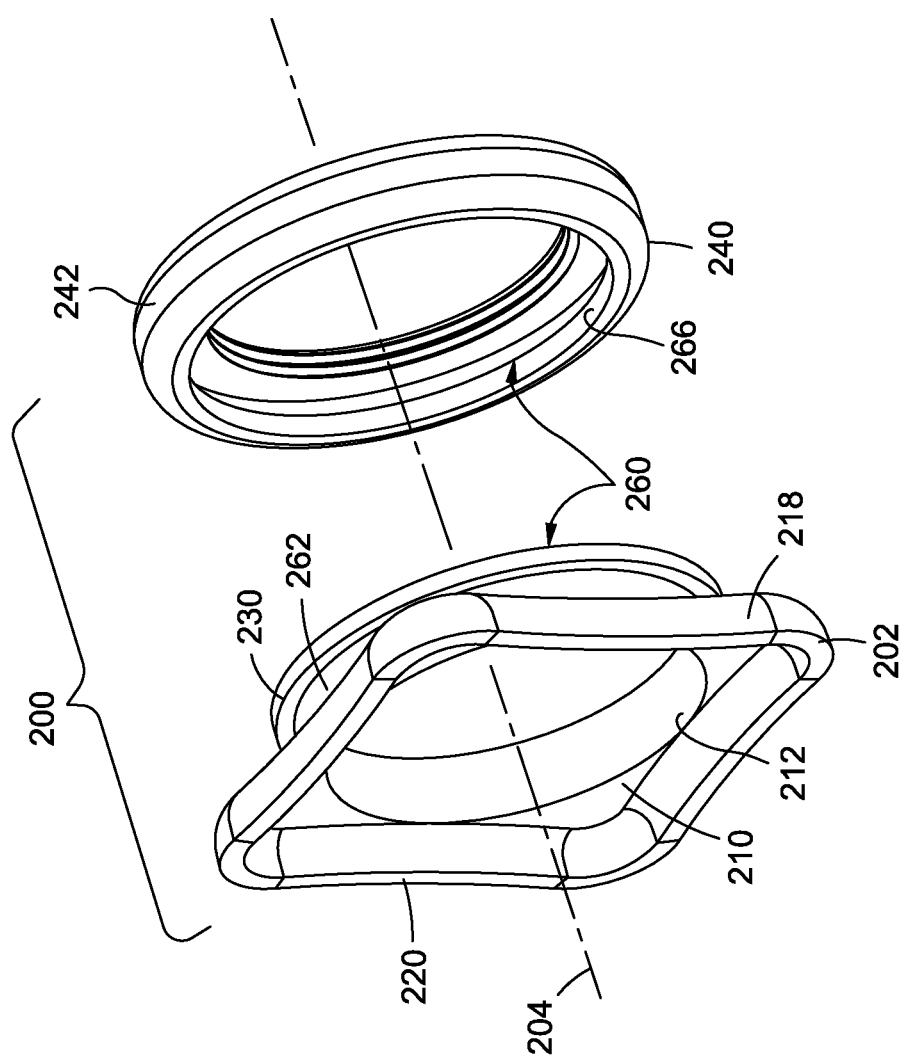
FIG. 6 is a rear perspective view of the mold body and mold collar of the seal molding system of FIG. 5 in the disassembled state.

FIG. 6 is a rear perspective view of the mold body 202 and mold collar 240 in a disassembled state. The mold body 202 has a mold body inner geometry 210 configured complementary to the fitting outer geometry 130 (e.g., FIG. 5). As shown in FIG. 5, the fitting outer geometry 130 is defined at least in part by the fitting body 126 including the fitting base 132 and which may include the fitting non-engagement portion 118 and the fitting threaded portion 116. As shown in FIG. 6 and mentioned above, the mold body 202 includes the mold body perimeter edge 220 which is configured to be positioned against the panel surface 102. The mold body perimeter edge 220 may have a contour configured to generally match the contour of the panel surface 102 (FIG. 5). Although the figures show the panel surface 102 as being planar, the panel surface 102 may be simply curved or complexly curved.

In FIG. 6, the mold body 202 further includes a radial lip 230 extending circumferentially around a ring flange 262 protruding axially from the mold body bore 212 of the mold body base portion 218. The mold collar 240 includes a mold collar gripping portion 242 having an outer shape configured to be gripped by a hand for rotating the mold collar 240 on the fitting threaded portion 116 (FIG. 5). In addition, the mold collar 240 includes a radial lip 266 configured to engage the radial lip 230 of the mold body 202 at the body-collar interface 260.

In any the examples disclosed herein, the body-collar interface 260 is configured to retain the mold collar 240 with the mold body 202 and allow free rotation of the mold collar 240 relative to the mold body 202 during engagement of one or more mold collar engagement elements 243 of the mold collar 240 with one or more fitting engagement elements 117 of the fitting 110, as described in greater detail below. For the example in FIGS. 5-32, the body-collar interface 260 retains the mold collar 240 with the mold body 202 and allows free rotation of the mold collar 240 relative to the mold body 202 during rotation of the mold collar threaded portion 244 relative to the fitting threaded portion 116. Rotation of the mold collar threaded portion 244 on the fitting threaded portion 116 causes axial movement of the mold body 202 relative to the fitting 110 and panel 100, as described below.

Figure 15:
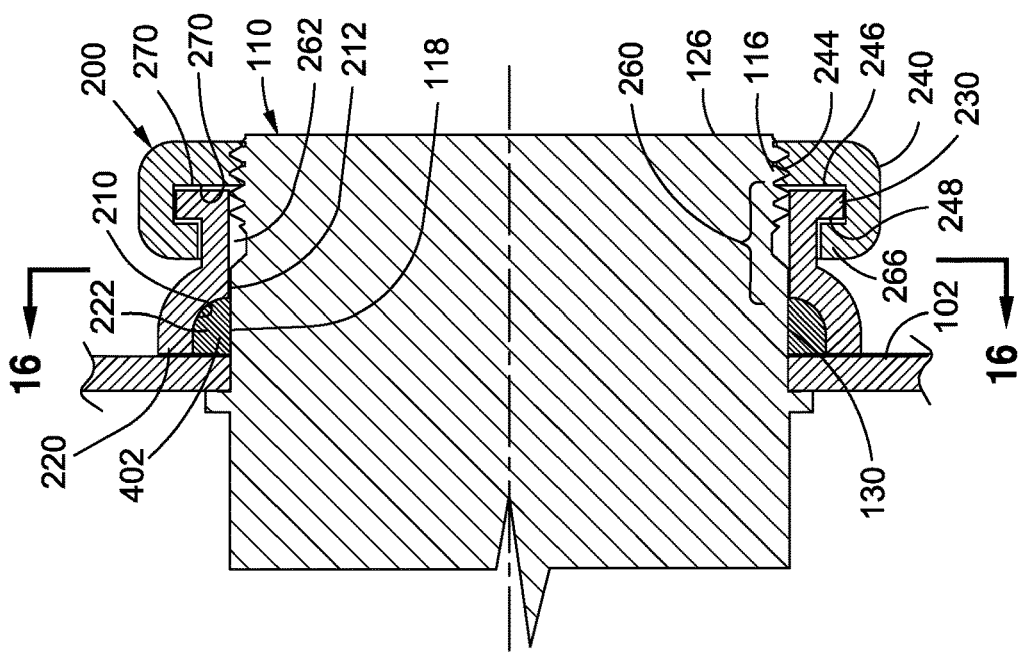
FIG. 15 is a sectional view of the seal molding system taken along line 15-15 of FIG. 14 and illustrating the mold collar threaded portion threadably engaged to the fitting threaded portion of the fitting.

Referring to FIGS. 7-8, shown in FIG. 7 is a top view of the mold body 202 of FIG. 5. FIG. 8 is a partial sectional view of the mold body 202. In the example shown, the mold body 202 may have a generally square shape when the mold body 202 is viewed from a top-down direction (e.g., along a direction parallel to the mold axis 204—FIG. 6). The square shape of the mold body 202 may be sized and configured to enclose a pattern of four (4) flange fasteners 136 (e.g., FIG. 5) at each corner of the mold body 202. The mold body 202 has a mold body base portion 218 having mold body sides 206 that may optionally have a concave shape 208 which may reduce the total volume of sealant 402 (FIG. 15) required to fill the mold cavity 222 (FIG. 15). However, the mold body base portion 218 may be provided in shapes other than a square shape. For example, the mold body base portion 218 may be provided in a rectangular shape (not shown) or other polygonal shape. Alternatively, the mold body base portion 218 may be provided in a circular shape (not shown).

In FIG. 7, the mold body 202 has at least one injection hole 226 for injecting sealant 402 (FIG. 15) into the mold cavity 222 (FIG. 15). The mold cavity 222 is collectively defined by the mold body inner geometry 210, the fitting outer geometry 130, and the panel surface 102. The mold body 202 may also include at least one vent hole 228. In the example shown, the injection hole 226 and the vent hole 228 are located on opposite sides of the mold body 202. However, the injection hole 226 and the vent hole 228 may be formed at any location of the mold body 202. The injection hole 226 is configured for receiving sealant 402 (FIG. 15) into the mold cavity 222 and the vent hole 228 allows excess sealant 402 to escape from the mold cavity 222 (FIG. 15). In addition, the vent hole 228 may allow air to escape from the mold cavity 222 as a means to reduce the formation of voids in the seal 400.

FIG. 8 shows the mold body bore 212 which is configured to encircle the fitting body 126 (FIG. 5). As described below and shown in FIG. 15, the mold body bore 212 encircles the fitting non-engagement portion 118 of the fitting body 126. As mentioned above, the mold body bore 212 may be shaped complementary to the shape of the fitting non-engagement portion 118. As shown in FIG. 7, mold body bore 212 may be cylindrical for encircling a fitting non-engagement portion 118 that is also cylindrical (e.g., FIG. 15). However, in an example not shown, the fitting non-engagement portion 118 may be non-cylindrical and the mold body bore 212 may be configured complementary to the non-cylindrical shape of the fitting non-engagement portion 118. For a fitting non-engagement portion 118 that is cylindrically-shaped, the mold body bore 212 may have a diameter that is equal to or slightly (e.g., 0.020 inch) larger than the diameter of the fitting non-engagement portion 118. The mold body bore 212 is preferably sized to reduce the width of a circumferential gap (not shown) that may exist between the mold body bore 212 and the fitting non-engagement portion 118 as a means to reduce the escape of sealant 402 through the circumferential gap as the sealant 402 fills the volume of the mold cavity 222 during injection of the sealant 402 into the mold cavity 222.

Referring still to the example of FIG. 8, the mold body 202 is shown having an axially extending ring flange 262. The ring flange 262 axially extends from the mold body bore 212. The ring flange 262 may have the same diameter as the mold body bore 212. However, in an example not shown, the ring flange 262 may be formed in a larger diameter than the mold body bore 212. In the example of FIG. 8, the mold body bore 212 and the ring flange 262 collectively define a mold body sleeve portion 214 which has a cylindrical inner surface configured complementary to a cylindrical outer surface of the fitting body 126 (FIG. 15). Similar to the above-mentioned configuration of the mold body bore 212, the mold body sleeve portion 214 may have a diameter that provides a clearance fit (e.g., up to 0.010 inch) with the diameter of the fitting body 126 (e.g., at the fitting non-engagement portion 118). In the example shown, the ring flange 262 of the mold body 202 has a radial lip 230 that protrudes radially outwardly and is configured to engage the radial lip 266 of the mold collar 240, as shown in FIG. 13 and described below.

Figures 9, 10:
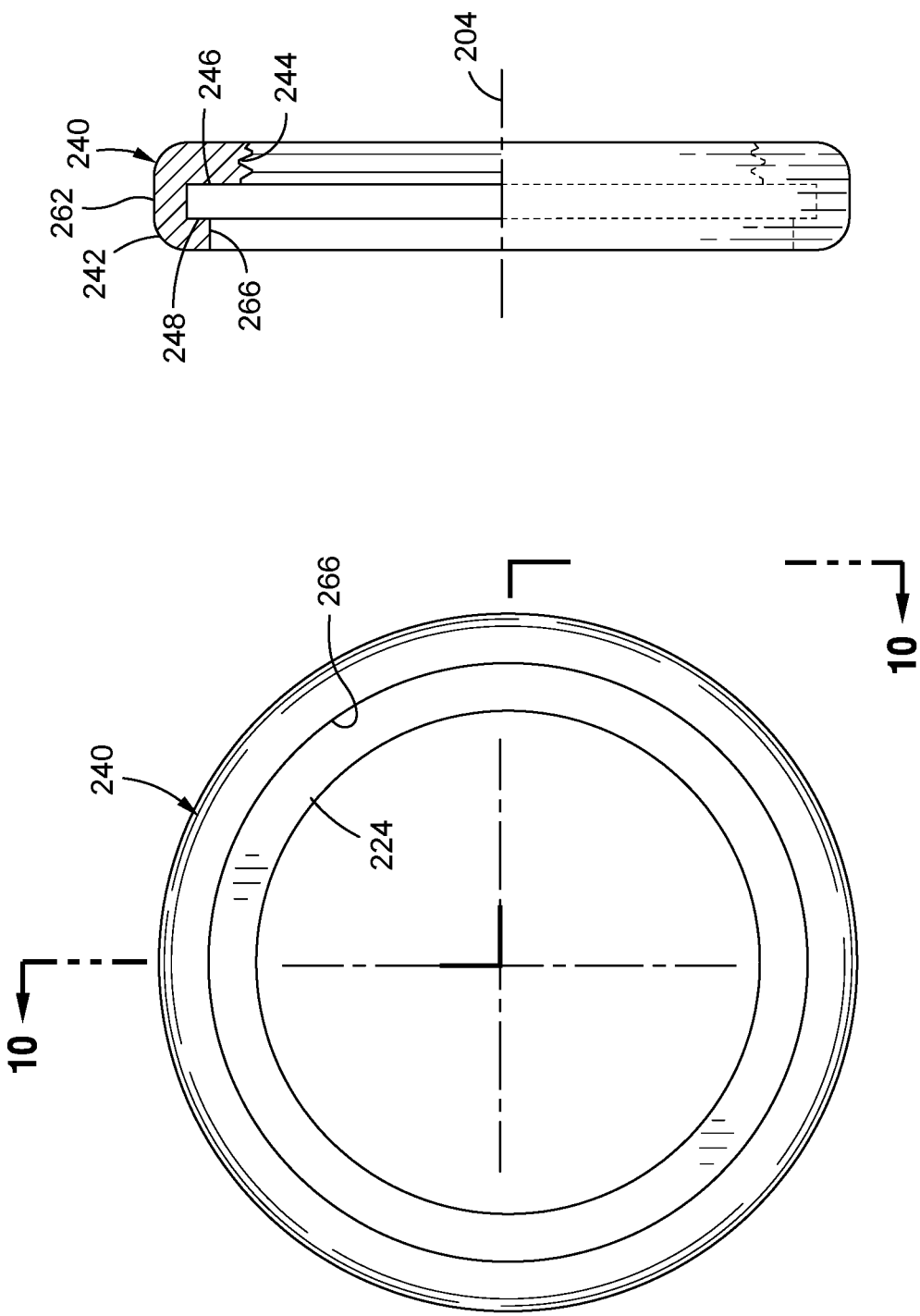
FIG. 9 is a top view of the mold collar of FIG. 5.
FIG. 10 is a partial sectional view of the mold collar taken along line 10-10 of FIG. 9 showing a mold collar engagement element configured as a mold collar threaded portion for engaging a fitting threaded portion of a fitting.

Referring to FIGS. 9-10, shown in FIG. 9 is a top view of the example of the mold collar 240 of FIG. 5. FIG. 10 is a partial sectional view of the mold collar 240. As mentioned above, the mold collar 240 includes a mold collar gripping portion 242 providing an outer surface that may be manually gripped for rotating the mold collar 240 on the fitting threaded portion 116. In the example shown, the mold collar gripping portion 242 has a cylindrical shape. However, the mold collar gripping portion 242 may be provided in any one a variety of alternative shapes. For example, the mold collar gripping portion 242 may have a generally hexagonal shape (e.g., FIG. 20) or any other shape conducive for gripping by a hand. Although not shown, the mold collar gripping portion 242 may optionally include surface features such as a textured surface to facilitate gripping of the mold collar 240. Alternatively, the mold collar gripping portion 242 may be configured as a faceted surface (not shown).

In FIGS. 9-10, the mold collar 240 further includes the above-mentioned mold collar engagement element 243 which, in the example shown, is configured as a mold collar threaded portion 244. The mold collar threaded portion 244 is internally threaded and is configured to be threadably engaged with the fitting threaded portion 116 (FIG. 15) which is externally threaded. In the example shown in FIGS. 9-10, the mold collar 240 includes an axially extending ring flange 262. The ring flange 262 of the mold collar 240 has a radial lip 266 configured to engage with the radial lip 230 of the mold body 202, as shown in FIG. 13 and mentioned above. The engagement of the radial lip 266 of the mold collar 240 with the radial lip 230 of the mold body 202 defines the body-collar interface 260 (FIG. 13) which is configured to retain the mold collar 240 with the mold body 202 and allow free rotation of the mold collar 240 relative to the mold body 202 during rotation of the mold collar threaded portion 244 relative to the fitting threaded portion 116.

In any one of the examples disclosed herein, the mold body 202 and the mold collar 240 may be manufactured from a mold material such as a polymeric mold material. For example, the mold collar 240 and/or the mold body 202 may be formed of polytetrafluoroethylene (PTFE) or Teflon™ which may result in a smooth surface finish on the mold body inner geometry 210 and may thereby form a corresponding smooth surface finish on the seal 400. In addition, the use of PTFE may avoid the need for a release agent to facilitate removal of the mold body 202 from the seal 400 following the cure of the sealant 402. In other examples, the mold collar 240 and/or the mold body 202 may be formed of synthetic polyamide material such as Nylon™, a low-density polyethylene, an ultra-high molecular weight polyethylene, or any one of a variety of other polymeric materials. Alternatively, the mold collar 240 and/or mold body 202 may be formed of non-polymeric material such as metallic material, ceramic material, or any one a variety of other materials or combinations thereof.

Figure 11:
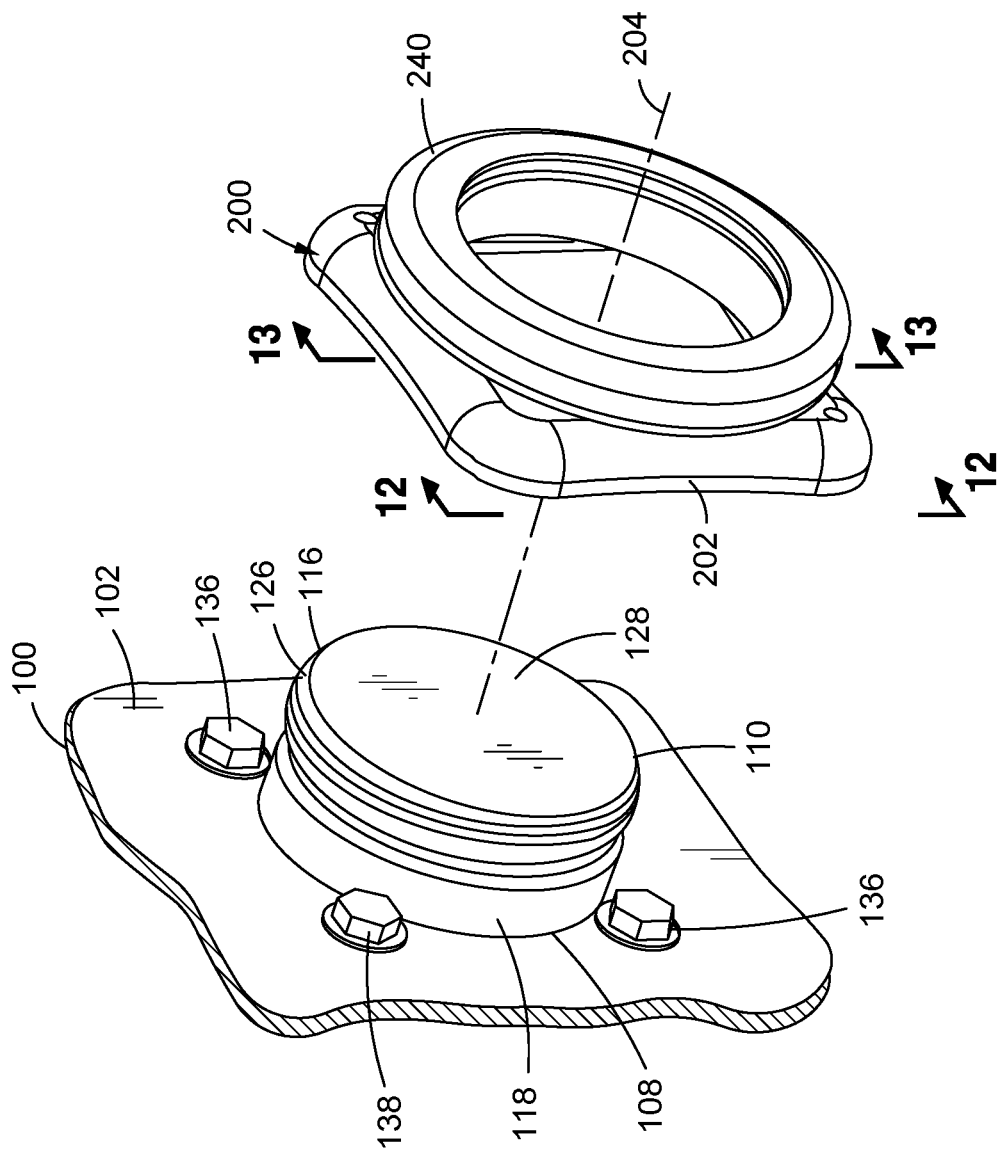
FIG. 11 is a front perspective view of the fitting installation of FIG. 5 and illustrating the seal molding system in the assembled state.

Referring to FIGS. 11-13, shown is an example of the seal molding system 200 in an assembled state prior to installation on the fitting body 126 of FIG. 11. FIG. 12 shows a side view of the seal molding system 200 in the assembled state. FIG. 13 is a sectional view of the seal molding system 200. In an embodiment, the mold collar 240 and the mold body 202 may be co-manufactured in the assembled state such as by using an additive manufacturing technique such as three-dimensional printing. Alternatively, the mold collar 240 and the mold body 202 may be separately manufactured using any one a variety of manufacturing techniques including, but not limited to, injection molding, machining, or casting. If separately manufactured, the mold body 202 may be assembled to the mold collar 240. For the example seal molding system 200 of FIGS. 5-19, the mold collar 240 may be assembled to the mold body 202 by temporarily radially expanding the ring flange 262 of the mold collar 240 to a larger diameter to allow the ring flange 262 to be axially moved over the radial lip 230 of the mold body 202, after which the ring flange 262 of the mold collar 240 may be allowed to radially contract back to its original size (e.g., diameter), resulting in the axial interlocking of the radial lip 266 of the mold collar 240 with the radial lip 230 of the mold body 202 at the body-collar interface 260 (FIG. 12).

As shown in FIG. 13, the radial lip 266 of the ring flange 262 of the mold collar 240 defines an annular groove within which the radial lip 230 of the mold body 202 is received and results in the interlocking of the mold collar 240 to the mold body 202 at the body-collar interface 260. The annular groove has a groove upper wall 246 and a groove lower wall 248. As described below, the groove upper wall 246 may function as a bearing surface 270 configured to bear against a bearing surface 270 of the mold body 202 for urging the mold body perimeter edge 220 against the panel surface 102 (FIG. 11) when the mold collar 240 is rotated relative to the fitting threaded portion 116 (FIG. 11). As is also described below, the groove lower wall 248 may engage the radial lip 230 of the mold body 202 for drawing the mold body perimeter edge 220 away from the panel surface 102 after the injection and curing of sealant 402 (FIG. 15) within the mold cavity 222 (FIG. 15).

Figure 14:
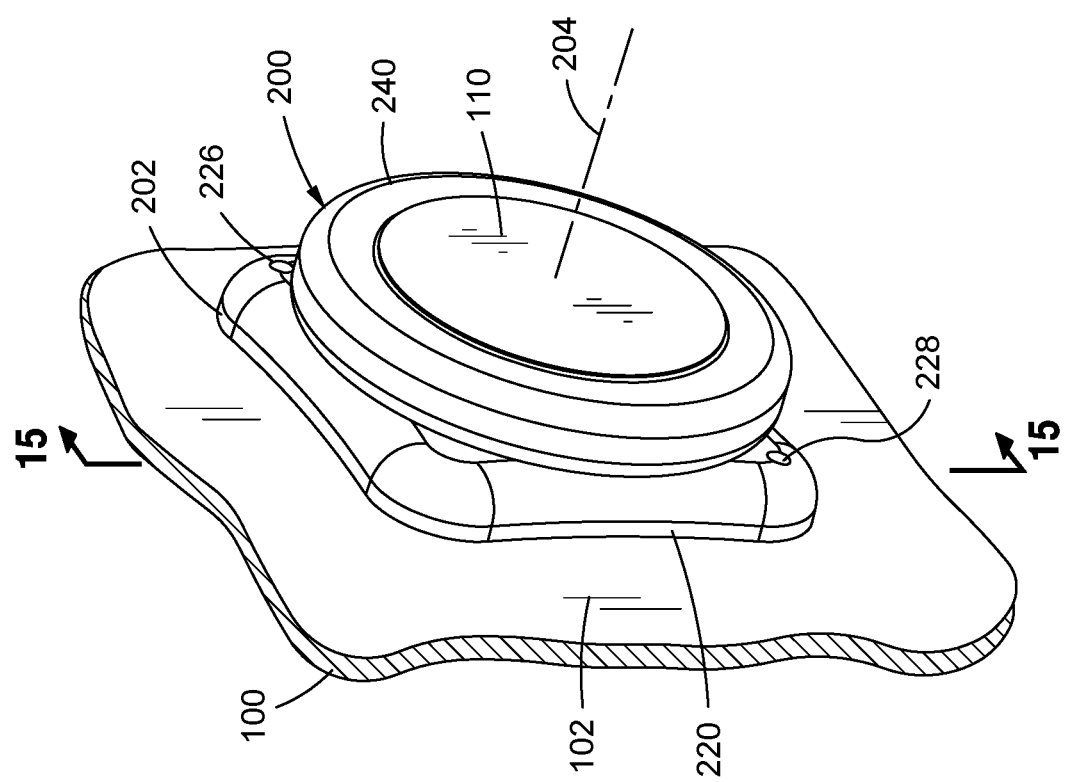
FIG. 14 is a front perspective view of the fitting installation illustrating the seal molding system installed on the fitting.

Referring to FIGS. 14-16, shown is the seal molding system 200 installed on a fitting 110. As shown in FIG. 15, the mold collar threaded portion 244 is threadably engaged to the fitting threaded portion 116. The mold collar 240 is coupled to the mold body 202 at the body-collar interface 260 which is configured to retain the mold collar 240 with the mold body 202 and allow free rotation of the mold collar 240 relative to the mold body 202 during rotation of the mold collar threaded portion 244 relative to the fitting threaded portion 116, as mentioned above.

In any one of the seal molding system 200 examples disclosed herein, the body-collar interface 260 is configured such that a combination of axial motion in a first axial direction (e.g., parallel to the mold axis 204) and rotational motion in a first rotational direction (e.g., about the mold axis 204) of the mold collar 240 relative to the fitting 110 causes the mold collar 240 to urge the mold body 202 against the panel surface 102, and a combination of axial motion in a second axial direction (opposite the first axial direction) and rotational motion in a second rotational direction (opposite the first rotational direction) of the mold collar 240 relative to the fitting 110 causes the mold collar 240 to draw the mold body 202 away from the panel 100. For the seal molding system 200 example of FIGS. 5-32 in which the mold collar 240 has a mold collar threaded portion 244 configured to engage the fitting threaded portion 116, the body-collar interface 260 is configured such that when the mold collar 240 is rotated in a first rotational direction on the fitting threaded portion 116 which causes simultaneous axial motion of the mold collar 240 in the first axial direction, the mold collar 240 urges the mold body perimeter edge 220 against the panel surface 102 (FIG. 15), and when the mold collar 240 is rotated in a second rotational direction (opposite the first rotational direction) which causes simultaneous axial motion of the mold collar 240 in the second axial direction (opposite the first axial direction), the mold collar 240 draws the mold body 202 away from the panel 100 and causes the mold body perimeter edge 220 to separate from the panel surface 102 to expose the seal 400 (FIG. 19).

In FIG. 15, the mold body perimeter edge 220 is urged against the panel surface 102. Sealant 402 may be injected into the injection hole 226 (FIG. 16) such as by using a sealant gun (not shown). Sealant 402 may be continuously injected into the mold cavity 222 until excess sealant 402 flows out of the vent hole 228 (FIG. 16). The sealant 402 may be allowed to cure after which the mold body 202 may be removed by rotating the mold collar 240 along the second rotational direction (not shown) opposite the first rotational direction causing simultaneous axial motion of the mold collar 240 in the second axial direction (not shown) opposite the first axial direction. Although not shown, the mold body inner geometry 210 may include a draft angle along the side walls of the mold body inner geometry 210 to facilitate removal of the mold body 202 from the seal 400 following the curing of the sealant 402.

Referring to FIG. 16, shown is a top view of the seal molding system 200 installed on the fitting 110. As mentioned above, the mold body base portion 218 includes at least one injection hole 226 for injecting sealant 402 (FIG. 15) into the mold cavity 222 (FIG. 15). In addition, the mold body 202 may include at least one vent hole 228 to allow for the escape of air and/or excess sealant 402 from the mold cavity 222 when the sealant 402 fills the volume of the mold cavity 222. In some examples of the seal molding system 200, the injection hole 226 and/or the vent hole 228 may be positioned in the mold body 202 such that the injection hole 226 and/or the vent hole 228 is centered on a fastener head 138 when the clocking orientation of the mold body 202 results in the lateral sides of each flange fastener 136 being equally spaced from the lateral sides (not shown) of the mold body inner geometry 210. In this regard, the injection hole 226 and/or vent hole 228 may function as an indexing feature for adjusting the clocking orientation of the mold body 202 relative to the flange fasteners 136 to ensure that the thickness of the seal 400 is substantially equivalent on the laterally opposing sides of each flange fastener 136.

Figure 18:
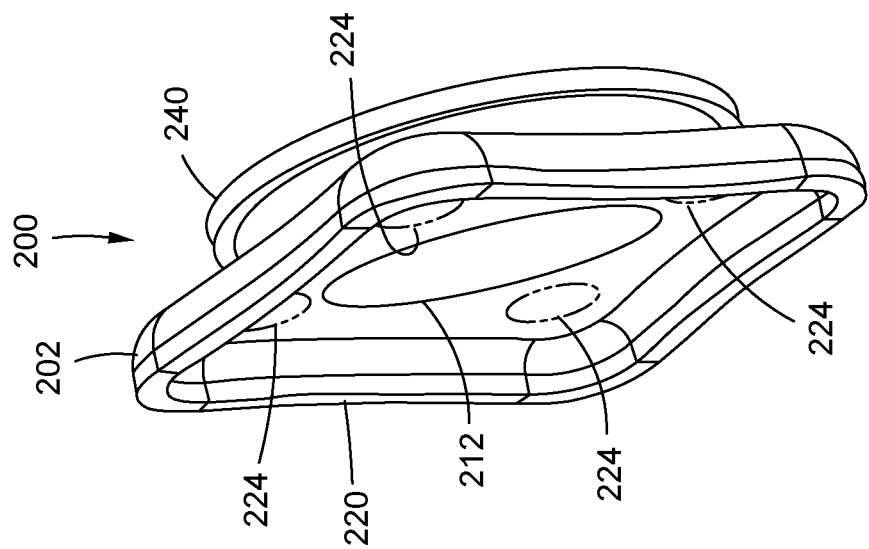
FIG. 18 is a rear perspective view of the seal molding system of FIG. 17.
Figure 17:
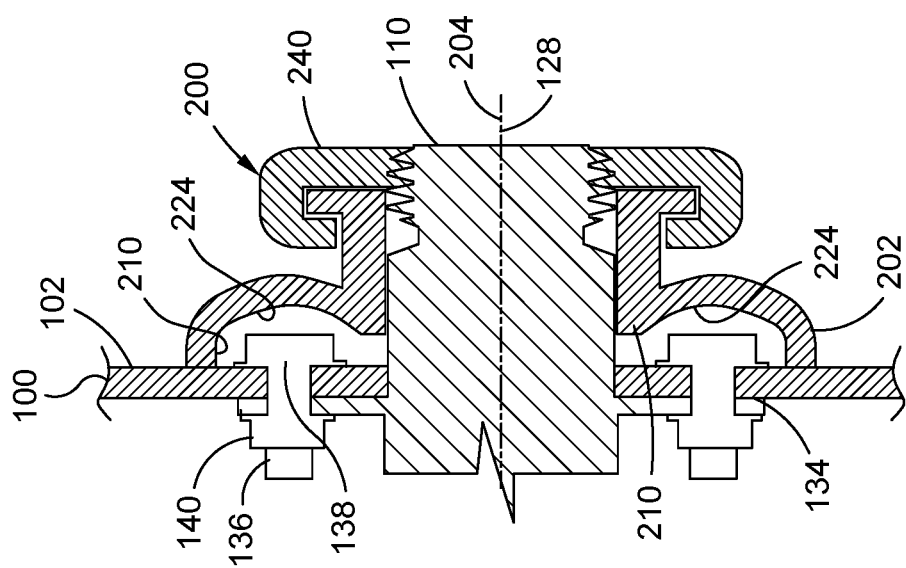
FIG. 17 is a sectional view (similar to FIG. 15) of a seal molding system in accordance with a further example embodiment.
Figure 19:
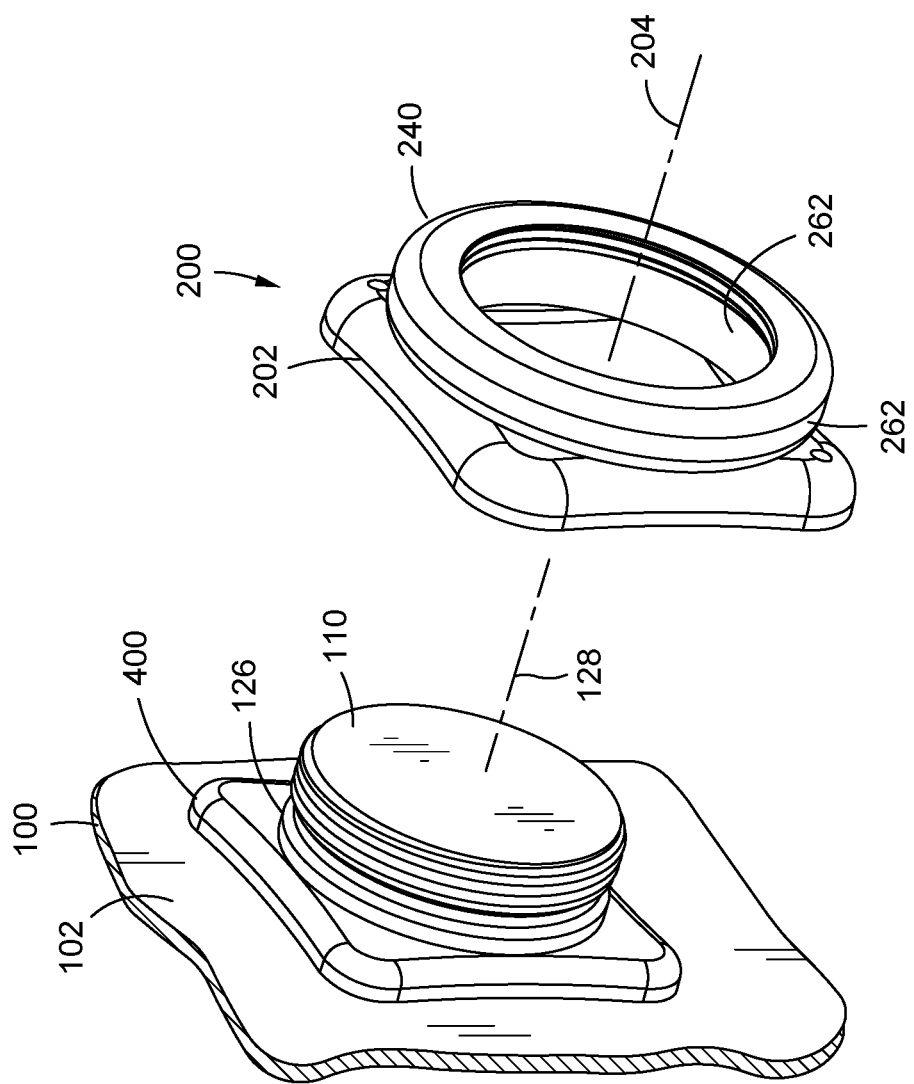
FIG. 19 is a front perspective view of the seal molding system of FIG. 14 after separation from the fitting and illustrating a seal molded around the fitting in accordance with one example embodiment.

Referring to FIGS. 17-18, shown is a further example of a seal molding system 200 in which the mold body inner geometry 210 includes a plurality of depressions 224 positioned in correspondence to the location of the plurality of flange fasteners 136 securing the fitting flange 134 to the panel 100. The depressions 224 may be formed within the mold body inner geometry 210 such that when the seal molding system 200 is installed on a fitting 110 as shown in FIG. 17, each depression 224 is generally centered on a fastener head 138. The depressions 224 may generally conform to the contour of the fastener heads 138 and thereby provide a means for controlling the thickness of the seal 400 (FIG. 19) at the location of each fastener head 138.

FIG. 19 shows an example of the seal molding system 200 after formation of the seal 400 and after removal of the seal molding system 200 from the fitting 110. The resulting seal 400 is molded around the fitting 110 and resulting in the seal 400 filling the circumferential gap 142 (FIG. 4) between the fitting body 126 and the panel hole 108. In addition, the seal 400 seals each one of the flange fasteners 136 (FIG. 15) to the panel surface 102.

Referring briefly again to FIG. 15, in any one of the seal molding system 200 examples disclosed herein, the mold body 202 and the mold collar 240 each include a bearing surface 270 at the body-collar interface 260 as mentioned above. The bearing surface 270 of the mold body 202 and the bearing surface 270 of the mold collar 240 may generally face toward each other and/or may have the same general orientation. The bearing surface 270 of the mold collar 240 may be configured to directly, physically bear against the bearing surface 270 of the mold body 202, resulting in a compression load between the mold collar 240 to the mold body 202 when the mold collar 240 is rotated in the first rotational direction resulting in simultaneous axial motion of the mold collar 240 in the first axial direction, and causing the mold collar 240 to urge the mold body perimeter edge 220 against the panel surface 102. In the example seal molding system 200 of FIGS. 13-16, the groove upper wall 246 may function as a bearing surface 270 for bearing against a bearing surface 270 of the mold body 202. The bearing surface 270 of the mold body 202 may be provided by the outwardly protruding radial lip 230 of the mold body 202. Contact between the bearing surface 270 of the mold body 202 and the bearing surface 270 of the mold collar 240 may cause the mold body perimeter edge 220 to be urged against the panel surface 102 when the mold collar 240 is rotated in the first rotational direction.

In any one of the seal molding system 200 examples disclosed herein, the mold body 202 and the mold collar 240 at the body-collar interface 260 each include either an axially extending ring flange 262 (e.g., FIGS. 5, 6, 8, 10, 13, 20-32) or a plurality of axially extending tabs 264 (e.g., FIGS. 21-24 and 28-32) or any one a variety of alternative axially extending structures. For example, in the seal molding system 200 illustrated in FIGS. 5-19, both the mold collar 240 and the mold body 202 have an axially extending ring flange 262. In the seal molding system 200 illustrated in FIGS. 20-32, the mold body 202 includes a plurality of axially extending tabs 264 and the mold collar 240 includes an axially extending ring flange 262. However, in an example not shown, the seal molding system 200 may be provided in an embodiment in which the mold body 202 includes an axially extending ring flange 262 and the mold collar 240 includes a plurality of axially extending tabs 264. In a still further example not shown, the seal molding system 200 may be provided in an embodiment in which both the mold body 202 and the mold collar 240 include a plurality of axially extending tabs 264. Regardless of whether the plurality of axially extending tabs 264 are provided on the mold body 202 and/or on the mold collar 240, the axially extending tabs 264 may be resiliently bendable to facilitate the axially extending tabs 264 snapping over one or more radial lips 266 of the mold collar 240 or mold body 202 during assembly of the mold collar 240 to the mold body 202.

The ring flange 262 or plurality of axially extending tabs 264 of the mold collar 240 each have the above-mentioned radial lip 230 as do the ring flange 262 or plurality of axially extending tabs 264 of the mold body 202. As mentioned above, the one or more radial lips 266 of the mold collar 240 may be configured to face toward the one or more radial lips 230 of the mold body 202 when the mold collar 240 is coupled to the mold body 202. The one or more radial lips 230 of the mold body 202 are sized and configured to snap over the one or more radial lips 266 of the mold collar 240 for coupling and retaining the mold body 202 to the mold collar 240. In some examples of the seal molding system 200, the one or more radial lips 230 of the mold body 202 may face radially outwardly, and the radial lips 266 of the mold collar 240 may face radial inwardly. In alternative examples of the seal molding system 200, the one or more radial lips 230 of the mold body 202 may face radially inwardly, and the one or more radial lips 266 of the mold collar 240 may face radially outwardly. The one or more radial lips 230 of the mold body 202 are configured to axially engage the one or more radial lips 266 of the mold collar 240 when the mold collar 240 is rotated in the second rotational direction and axially moved in the second axial direction causing a tension load between the mold collar 240 and the mold body 202 and resulting in the mold collar 240 drawing the mold body 202 away from the panel surface 102 to expose the seal 400 after the sealant 402 within the mold cavity 222 has cured to form a seal 400.

Figure 20:
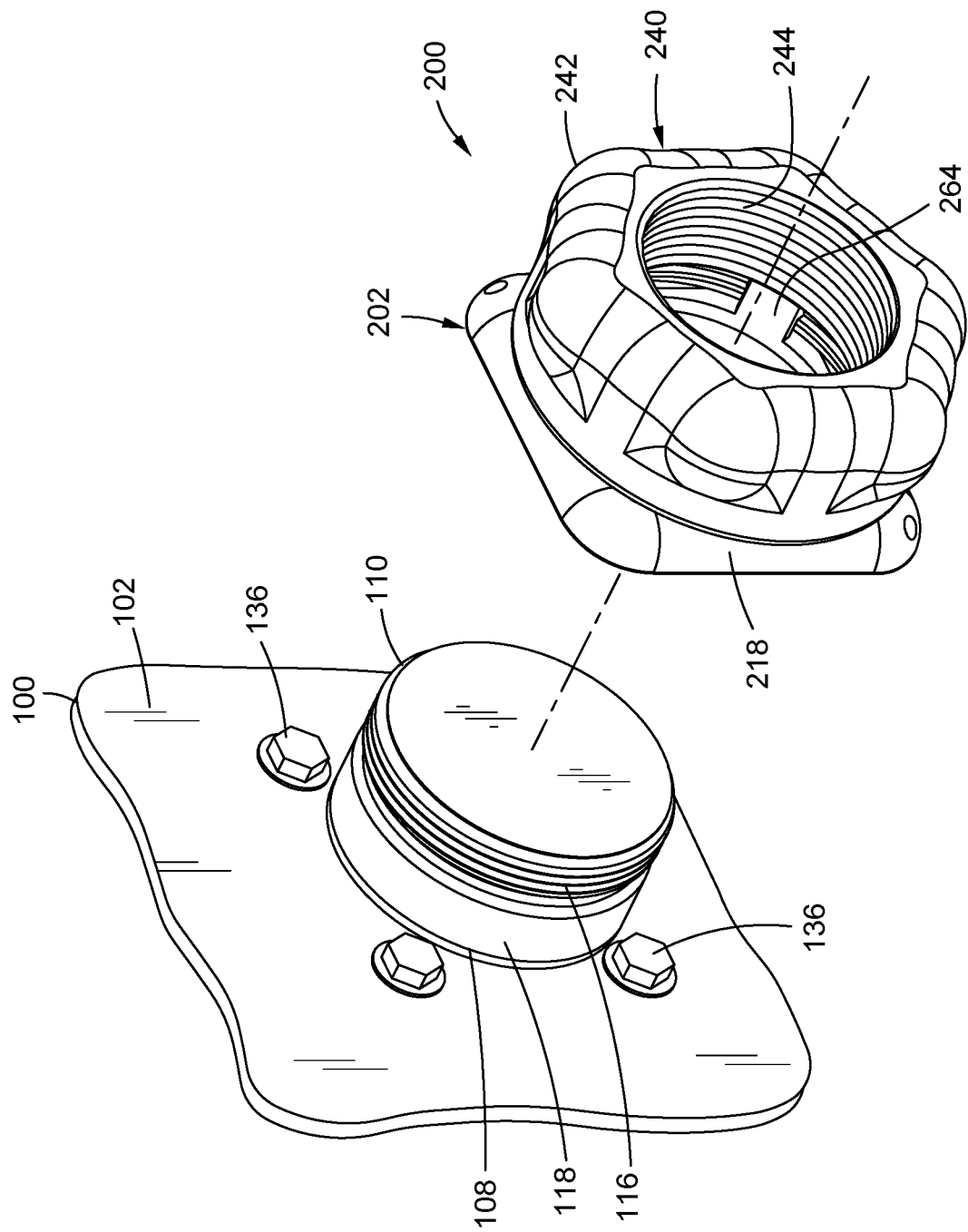
FIG. 20 is a front perspective view of the fitting installation and a seal molding system each in an assembled state in accordance with a further example embodiment.

Referring now to FIGS. 20-32, shown is a further example of the seal molding system 200. FIG. 20 shows the seal molding system 200 in an assembled state and prior to installation on a fitting 110 for which the fitting engagement element 117 is configured as a fitting threaded portion 116. The mold collar 240 has a mold collar engagement element 243 configured as a mold collar threaded portion 244 configured to be threadably engaged to the fitting threaded portion 116. The mold collar 240 has a mold collar gripping portion 242 having a rounded hexagonal shape to accommodate gripping by a hand. The mold body base portion 218 is configured substantially similar to the mold body base portion 218 shown in FIGS. 5-19.

Figure 21:
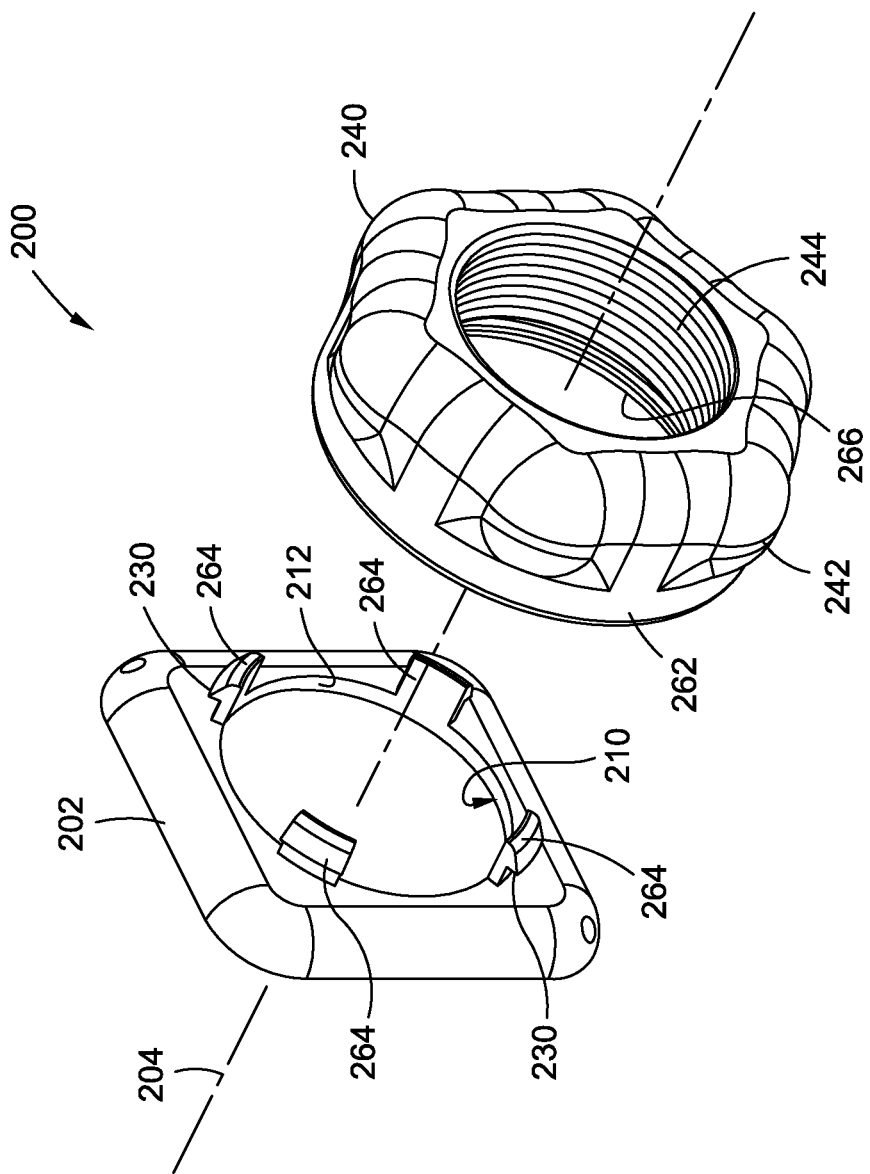
FIG. 21 is a front perspective view of the seal molding system of FIG. 20 and illustrating the mold body and the mold collar in a disassembled state.
Figure 22:
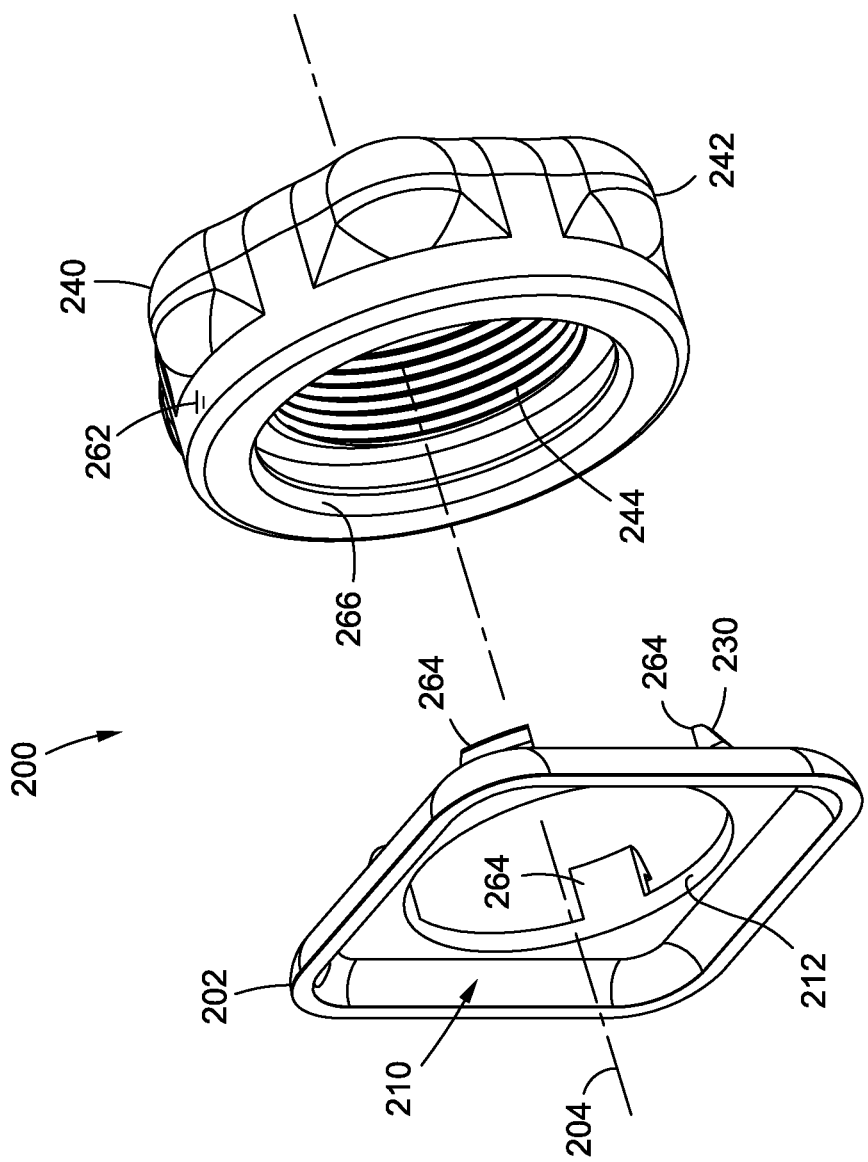
FIG. 22 is a rear perspective view of the mold body and mold collar of the seal molding system of FIG. 21 in the disassembled state.

FIGS. 21-22 shows the mold body 202 and the mold collar 240 of the seal molding system 200 of FIG. 20 in a disassembled state. The mold body inner geometry 210 includes a mold body bore 212 having a cylindrical shape configured to encircle a fitting non-engagement portion 118 (FIG. 20) which also has a cylindrical shape. The mold body bore 212 has a plurality of axially extending tabs 264 extending from the mold body base portion 218. Each one of the axially extending tabs 264 has an outwardly protruding radial lip 230. The mold collar 240 has an axially extending ring flange 262 extending along a direction opposite the mold collar threaded portion 244. The axially extending ring flange 262 of the mold collar 240 has an inwardly protruding radial lip 266 configured to engage with the outwardly protruding radial lip 230 of the mold body 202.

Figure 24:
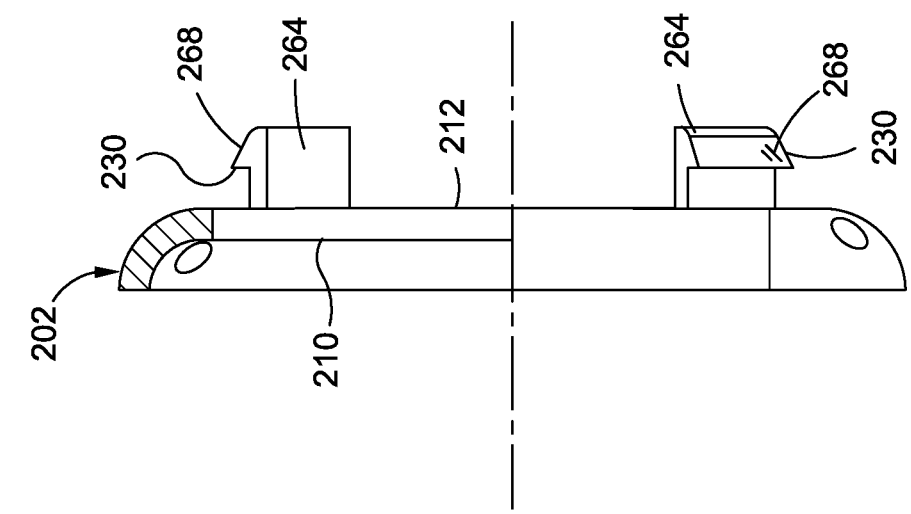
FIG. 24 is a partial sectional view of the mold body taken along line 24-24 of FIG. 23.
Figure 23:
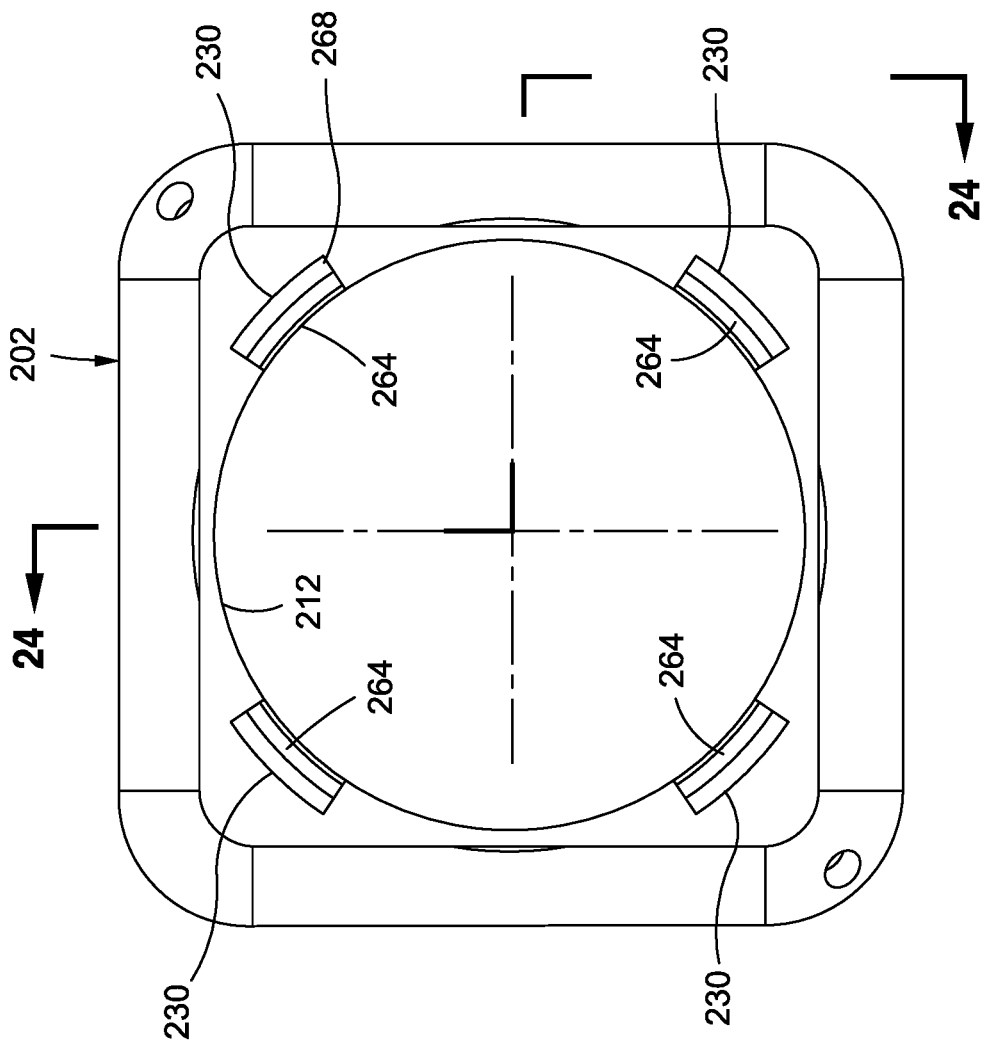
FIG. 23 is a top view of the mold body of FIG. 22.

Referring to FIGS. 23-24, shown is the example of the mold body 202 of FIGS. 20-22. The mold body 202 is shown having four (4) axially extending tabs 264 equiangularly spaced around the mold body bore 212. The radially inner surface of each axially extending tab 264 is a cylindrical extension of the mold body bore 212. Although four (4) axially extending tabs 264 are shown, a mold body 202 may have any number of axially extending tabs 264. For example, a mold body 202 may include a pair of diametrically opposed axially extending tabs 264, or the mold body 202 may include three (3) or more axially extending tabs 264 that are either equiangularly spaced or non-equiangularly spaced. Each one of the axially extending tabs 264 may be resiliently flexible to allow the axially extending tabs 264 to flex in a radial direction to allow the outwardly protruding radial lip 230 of each axially extending tab 264 of the mold body 202 to pass over the inwardly protruding radial lip 266 of the axially extending ring flange 262 of the mold collar 240. Further in this regard, the radial lip 230 of the axially extending tabs 264 of the mold body 202 may each have a ramped surface 268 to facilitate coupling to the radial lip 266 of the mold collar 240.

Figure 26:
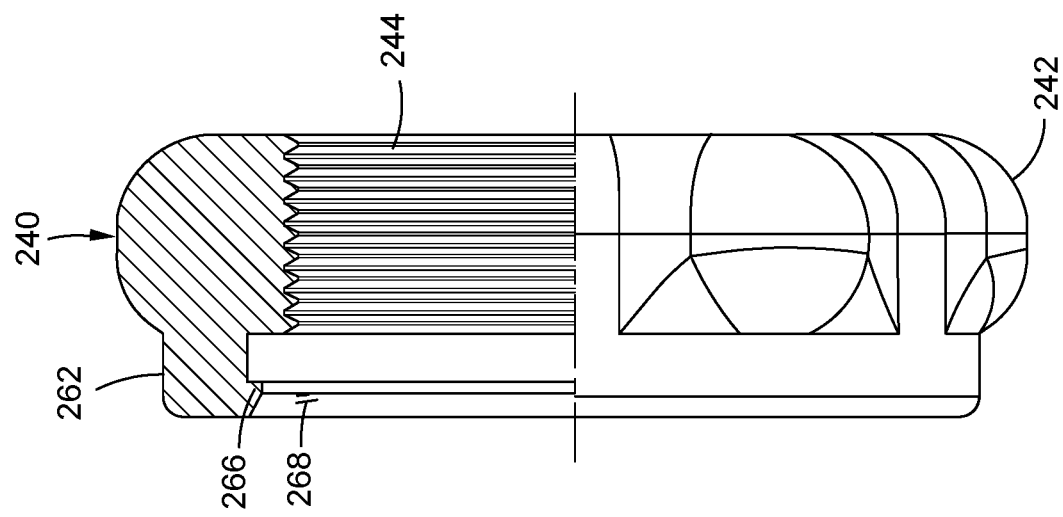
FIG. 26 is a partial sectional view of the mold collar taken along line 26-26 of FIG. 25.
Figure 25:
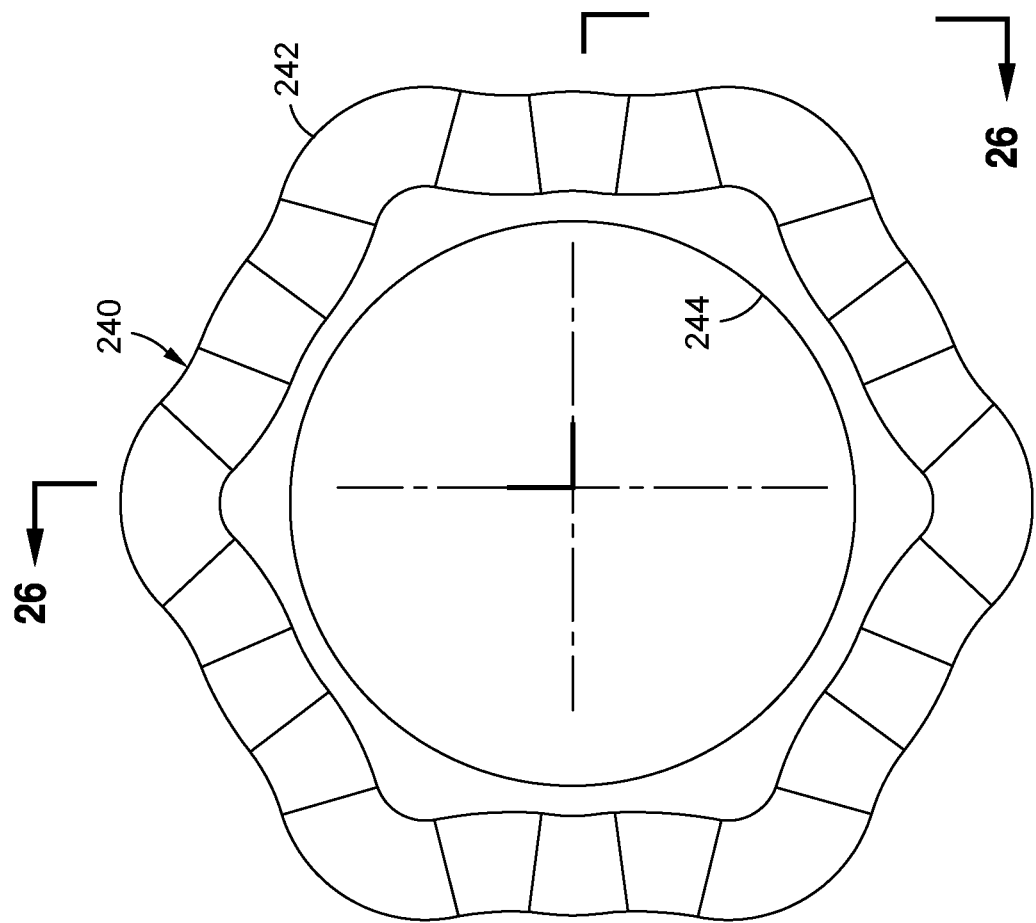
FIG. 25 is a top view of the mold collar of FIG. 22.

Referring to FIGS. 25-26, shown is the example of the mold collar 240 of FIGS. 20-22. FIG. 25 illustrates the rounded hexagonal shape of the mold collar gripping portion 242. FIG. 26 illustrates the axially extending ring flange 262. Also shown is the inwardly protruding radial lip 266 of the mold collar 240 configured to engage with the outwardly protruding radial lips 230 of the axially extending tabs 264 of the mold body 202 (FIGS. 23-24). The radial lip 266 of the ring flange 262 of the mold collar 240 has a ramped surface 268 to facilitate coupling to the radial lip 230 of the mold body 202.

Figure 28:
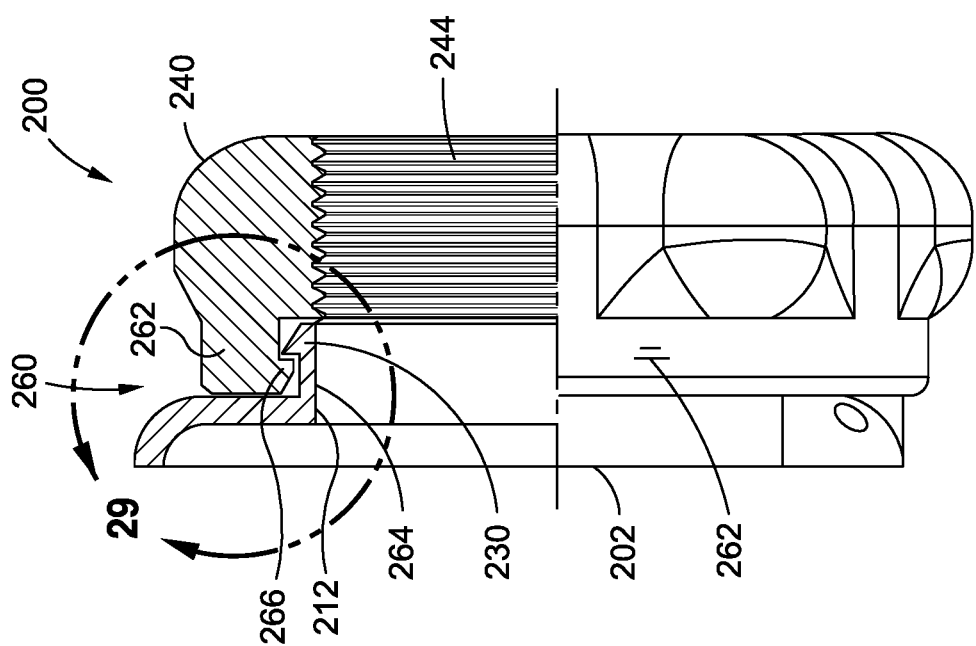
FIG. 28 is a partial sectional view of the seal molding system taken along 28-28 of FIG. 27.
Figure 27:
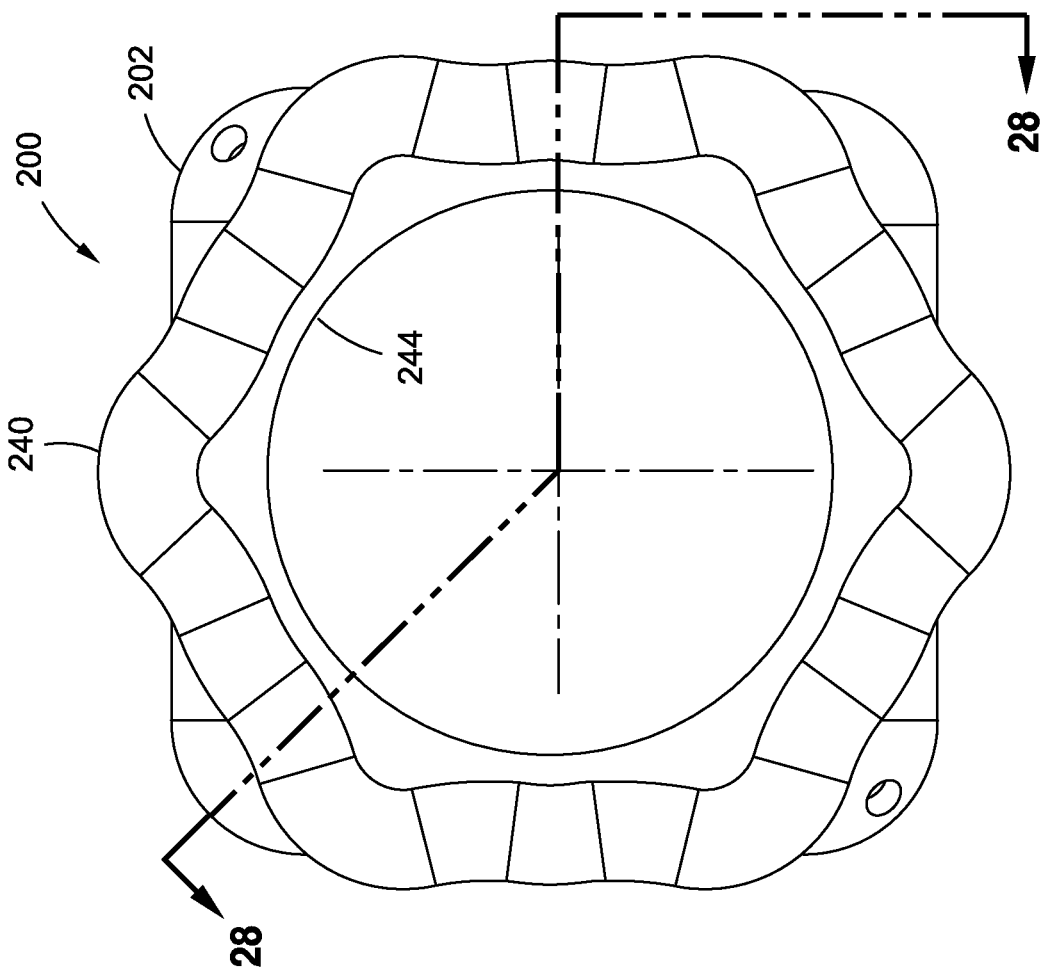
FIG. 27 is a top view of the mold body and mold collar of the seal molding system of FIG. 22 in the assembled state.
Figure 29:
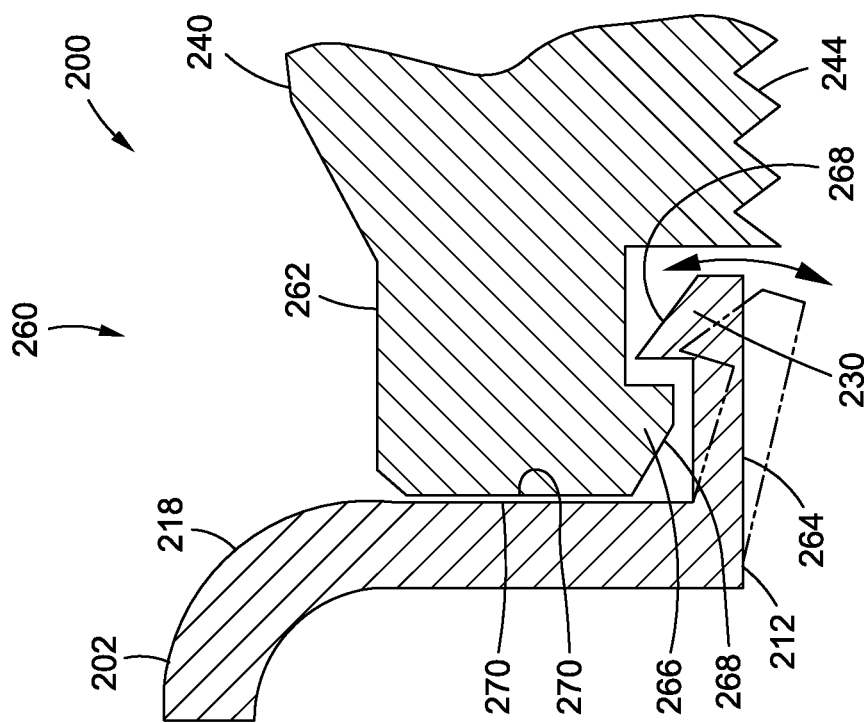
FIG. 29 is a magnified view of a body-collar interface of a seal molding system of encircled region identified by reference numeral 29 of FIG. 28.

Referring to FIGS. 27-29, shown is the mold collar 240 and mold body 202 of FIG. 20-22 in the assembled state. The axially extending tabs 264 of the mold body 202 are located radially inboard of the axially extending ring flange 262 of the mold collar 240. FIG. 29 shows the body-collar interface 260 within which the radial lip 266 of the mold collar 240 is interlocked with the radial lip 230 of the axially extending tabs 264 of the mold body 202. As mentioned above, the axially extending tabs 264 may be configured to flex in a radial direction to allow the outwardly protruding radial lip 230 of each axially extending tab 264 of the mold body 202 to pass over the inwardly protruding radial lip 266 of the axially extending ring flange 262 of the mold collar 240. As indicated above, the mold body 202 and the mold collar 240 each have a bearing surface 270 at the body-collar interface 260. The bearing surface 270 of the mold collar 240 is located on the axial end of the axially extending ring flange 262. The bearing surface 270 of the mold body 202 comprises an annularly shape portion of the surface of the mold body base portion 218. As mentioned above, when the mold collar 240 is rotated in the first rotational direction on the fitting threaded portion 116 causing simultaneous axial motion of the mold collar 240 in the first axial direction, the bearing surfaces 270 of the mold collar 240 and mold body 202 are placed in contact with each other causing the mold collar 240 to urge the mold body 202 against the panel surface 102.

FIG. 29 is a magnified view of an example of a body-collar interface 260 of a seal molding system 200. The axially extending tabs 264 of the mold body 202 are located radially outboard of the axially extending ring flange 262 of the mold collar 240. As may be appreciated, a seal molding system 200 may be provided in a variety of combinations regarding the radial location of the ring flange 262 relative to the radial location of the axially extending tabs 264. For example, a mold body 202 may include a ring flange 262 that is located radially inboard of a ring flange 262 of a mold collar 240. Alternatively, the mold body 202 may include a plurality of axially extending tabs 264 that are located radially inboard of a ring flange 262 of the mold collar 240 as shown in the seal molding system 200 of FIGS. 20-32.

Figure 30:
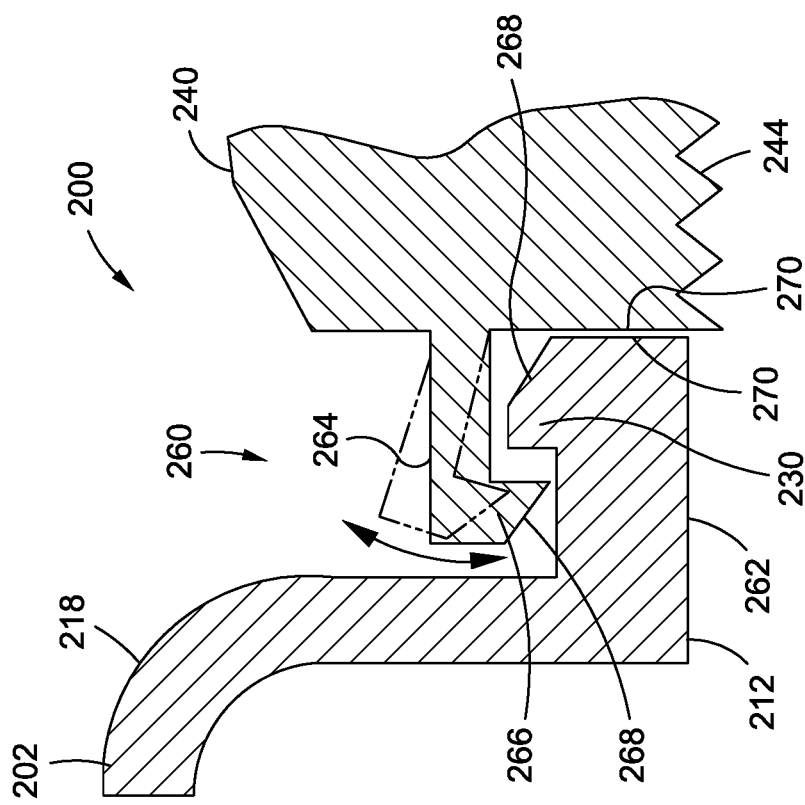
FIG. 30 is a magnified view (similar to FIG. 29) of a further example of a body-collar interface of a seal molding system in accordance with a further example embodiment.

FIG. 30 illustrates a still further example of the seal molding system 200 in which the mold body 202 include a ring flange 262 located radially inboard of a plurality of axially extending tabs 264 of the mold collar 240. The radial lip 230 of the ring flange 262 of the mold body 202 has a ramped surface 268 to facilitate coupling to the radial lips 266 of the axially extending tabs 264 of the mold collar 240. In FIG. 30, the bearing surface 270 of the mold body 202 is located on the axially outermost surface of the ring flange 262. The bearing surface 270 of the mold collar 240 is located radially inboard of the plurality of axially extending tabs 264.

Referring to FIGS. 31-32, shown is a further example of a seal molding system 200 in which the mold body 202 has a plurality of axially extending tabs 264 located radially outboard of an axially extending annular ring flange 262 of the mold collar 240. Each one of the axially extending tabs 264 has an inwardly protruding radial lip 230. The axially extending ring flange 262 of the mold collar 240 is located radially inboard of the plurality of axially extending tabs 264 of the mold body 202. The axially extending ring flange 262 of the mold collar 240 has an outwardly protruding radial lip 266 configured to engage with the inwardly protruding radial lips 230 of the axially extending tabs 264 of the mold body 202.

In FIGS. 31-32, the mold body 202 also includes an annular projection 216 located radially inboard of the plurality of axially extending tabs 264. The annular projection 216 extends axially from the mold body bore 212. The annular projection 216 as a generally triangularly-shaped cross-section and includes a bearing surface 270 that is annular and generally radially outwardly facing. In the cross-sectional view of FIG. 32, the bearing surface 270 of the annular projection 216 is oriented non-perpendicular to the mold axis 204.

For the mold collar 240 in FIGS. 31-32, the ring flange 262 has a radially inwardly facing bearing surface 270 that is also oriented non-perpendicular to the mold axis 204. In this regard, the bearing surface 270 of the ring flange 262 may be oriented at an angle that is complementary to or slightly smaller (e.g., by up to 20 degrees) than the angle of the bearing surface 270 of the annular projection 216 of the mold body 202. The radially inwardly facing bearing surface 270 of the ring flange 262 of the mold collar 240 is configured to bear against the radially outwardly facing bearing surface 270 of the mold body 202 for generating a body-collar compression force 300 on the annular projection 216 when the mold collar 240 is rotated in the first rotational direction relative to the fitting threaded portion 116.

Referring to FIG. 32, the bearing surface 270 of the ring flange 262 and the bearing surface 270 of the annular projection 216 are oriented in a manner causing a radial force component 302 of the body-collar compression force 300 to be generated for urging the annular projection 216 radially inward against the cylindrical surface of the fitting non-engagement portion 118 when the mold collar 240 is rotated in the first rotational direction. In addition, an axial force component 304 of the body-collar compression force 300 is generated for urging the mold body perimeter edge 220 against the panel surface 102 when the mold collar 240 is rotated in the first rotational direction. Advantageously, the radial force component 302 forces the annular projection 216 against the fitting body 126 to reduce or close any annular gap (not shown) that may otherwise occur and through which sealant 402 may otherwise escape during the injection of sealant 402 into the mold cavity 222. Simultaneously with the generation of the radial force component 302, the axial force component 304 is generated to force the mold body perimeter edge 220 against the panel surface 102 to reduce or prevent sealant 402 from escaping at a gap (not shown) that may otherwise occur between the mold body perimeter edge 220 and the panel surface 102.

Figure 33:
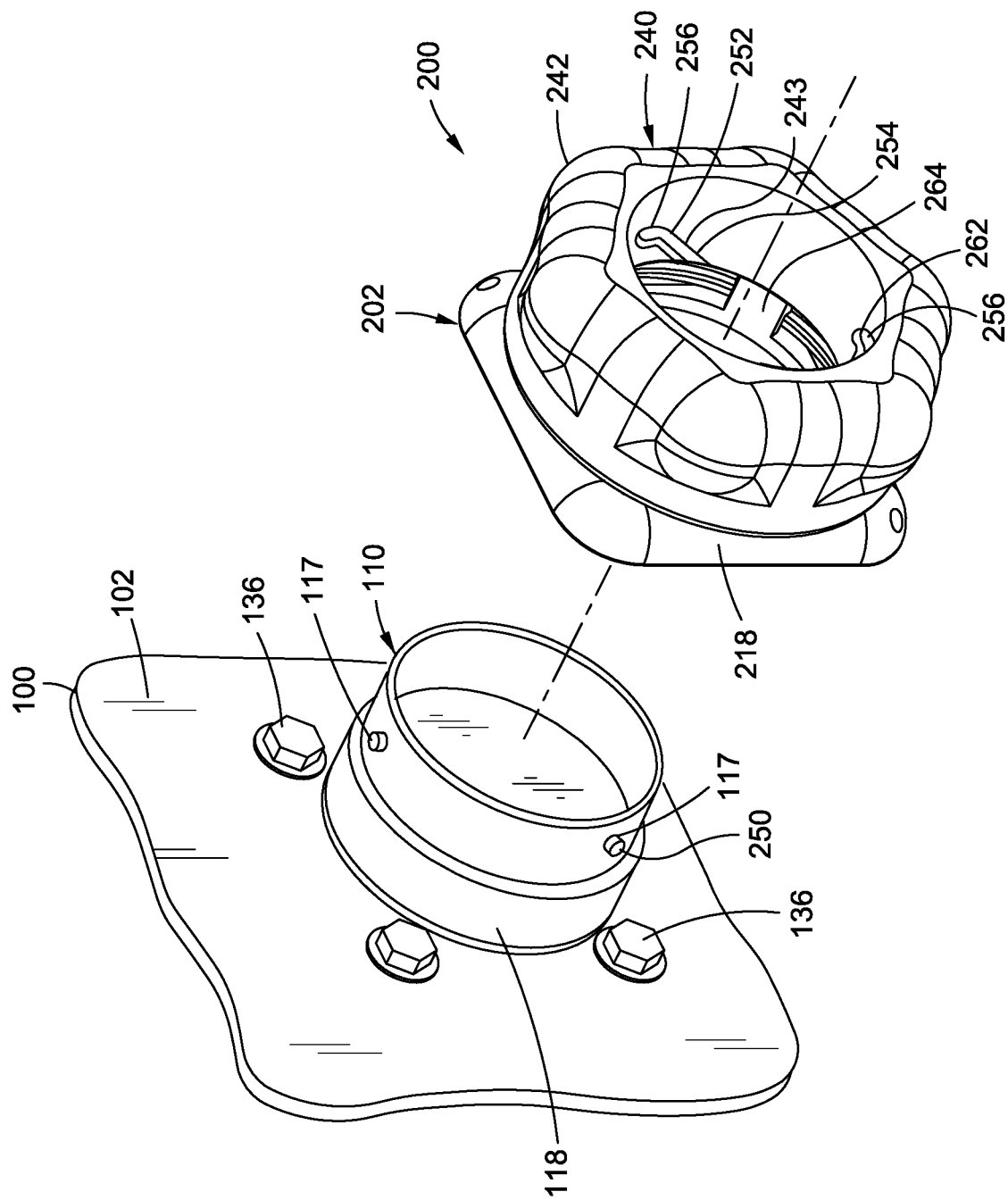
FIG. 33 is a perspective view of a fitting installation and an example of a seal molding system in which the mold collar engagement elements are configured as a plurality of helically oriented slots for engaging a plurality of posts protruding radially outwardly from the fitting in accordance with a further example embodiment.
Figure 34:
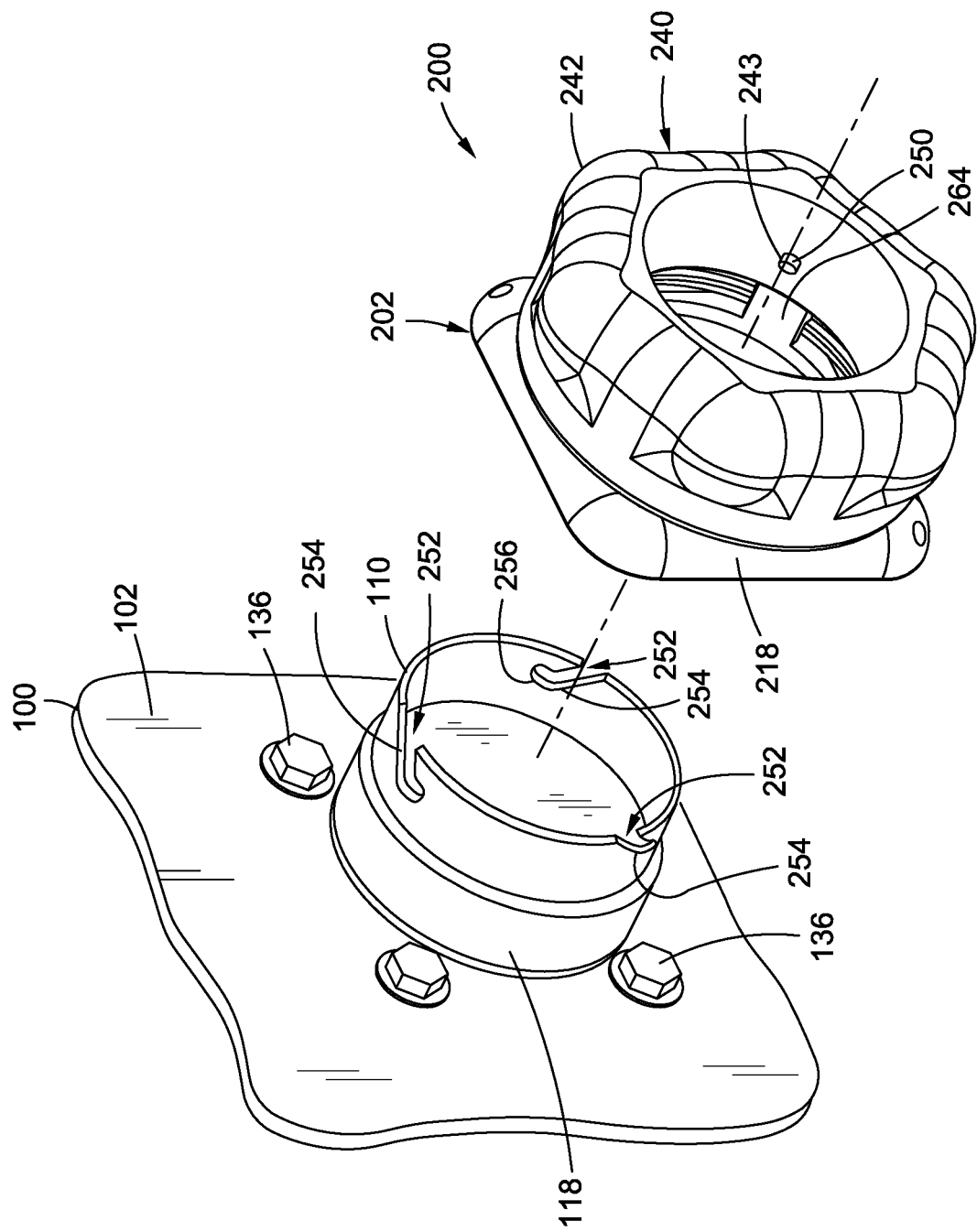
FIG. 34 is a perspective view of a seal molding system in which the mold collar engagement elements are configured as a plurality of posts protruding radially inwardly for engaging a plurality of helically oriented slots of the fitting, in accordance with a further example embodiment.
Figure 35:
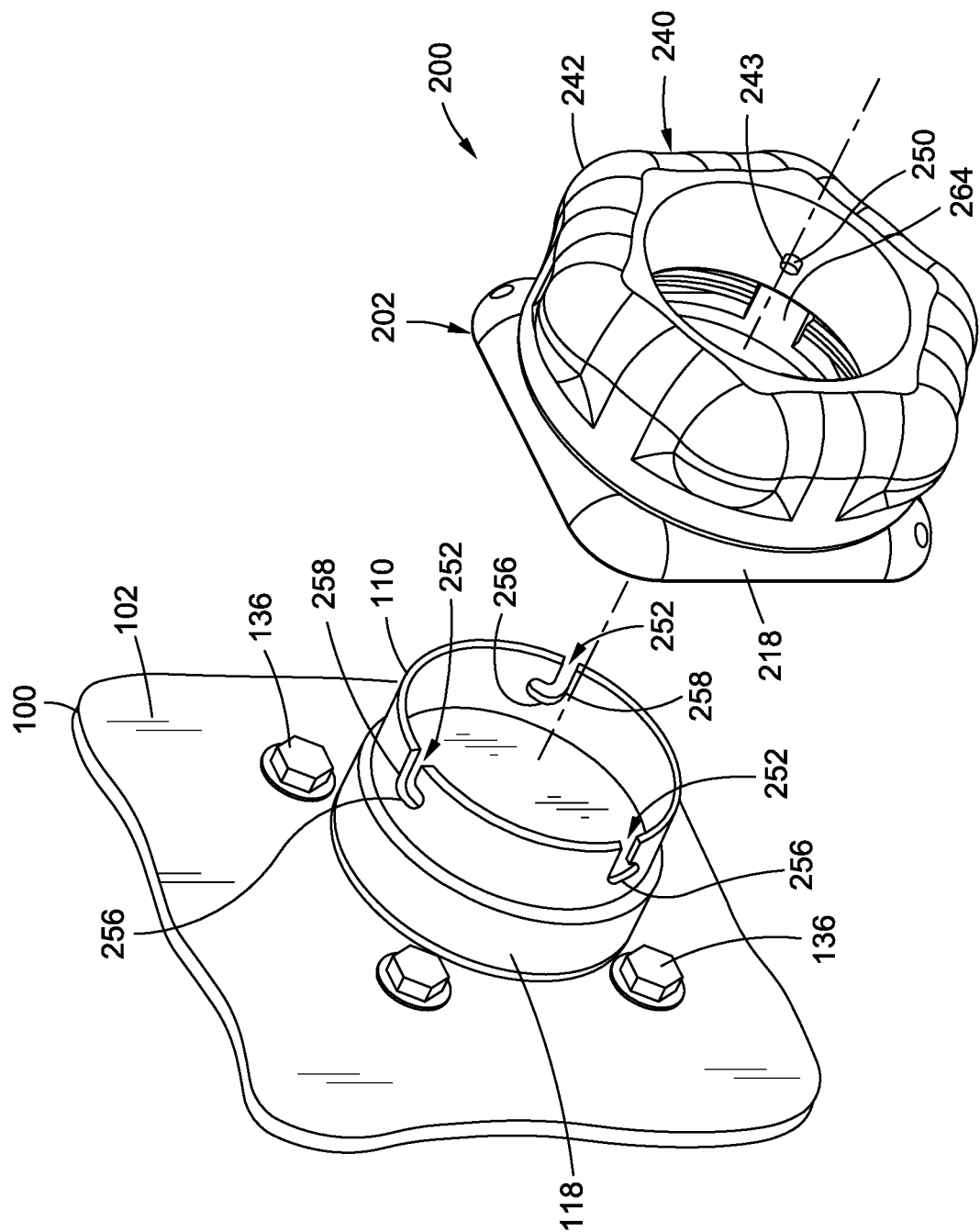
FIG. 35 is a perspective view of a seal molding system in which the slots in the fitting include an axial portion, in accordance with a further example embodiment.

Referring to FIGS. 33-35, shown are examples of a seal molding system 200 in which the fitting engagement elements 117 of the fitting 110 comprise either a plurality of posts 250 or a plurality of slots 252, and the mold collar engagement elements 243 of the mold collar 240 comprise either a plurality of slots 252 or a plurality of posts 250 configured to respectively engage the plurality of posts 250 or plurality of slots 252 of the fitting 110. The posts 250 are radially protruding in either a radially inward direction or in a radially outward direction. Although shown in FIGS. 33-35 as having cylindrical shape, the posts 250 may be provided in any one of a variety of alternative shapes. The slots 252 are oriented axially, helically, radially, or any combination thereof. In the present disclosure, the slots 252 encompass grooves that extend partially through the thickness of the material into which the groove is formed. The seal molding system 200 examples shown in FIGS. 33-35 may have any or all of the same functionalities and/or structural configurations of any of the examples described above and/or shown in FIGS. 5-32 including any one of the structural arrangements of the body-collar interface 260 of the mold collar 240 and mold body 202.

FIG. 33 is a perspective view of a fitting installation and showing an example of a seal molding system 200 in which the mold collar engagement elements 243 are configured as a plurality of generally helically oriented slots 252 configured to engage a plurality of posts 250 protruding radially outwardly from the fitting 110. The slots 252 in the mold collar 240 are angularly spaced in correspondence to the angular spacing of the posts 250 on the fitting 110. Although the slots 252 in FIG. 33 are shown as grooves extending partially into the inner cylindrical sidewall of the mold collar 240, in an alternative embodiment not shown, the mold collar 240 may include an inner annular sleeve and the slots 252 may extend completely through the thickness of the inner annular sleeve. Regardless of the specific configuration of the examples of FIGS. 33-35, the slots 252 are configured such that a combination of axial motion in a first axial direction and rotational motion in a first rotational direction of the mold collar 240 relative to the fitting 110 causes the mold collar 240 to urge the mold body 202 against the panel surface 102, and a combination of axial motion in a second axial direction and rotational motion in a second rotational direction of the mold collar 240 relative to the fitting 110 causes the mold collar 240 to draw the mold body 202 away from the panel 100.

For the example of FIG. 33, during installation of the mold collar 240 onto the fitting 110, the posts 250 are inserted into the helically-oriented slots 252. The slots 252 are oriented such that counterclockwise rotation of the mold collar 240 urges the mold body 202 toward the panel 100, and clockwise rotation draws the mold body 202 away from the panel 100. Due to the helical portion 254 of the slots 252, rotation of the mold collar 240 causes simultaneous axial motion of the mold collar 240 which draws the mold collar 240 and mold body 202 toward the panel surface 102. The slots 252 are configured that when the posts 250 reach the end of the helical portion 254 of the slots 252, the mold body perimeter edge 220 is in contact with the panel surface 102, after which the mold collar 240 may be further rotated a short distance as the posts 250 move within a radial portion 256 of the slots 252 until reaching a terminal end of the slots 252. The radial portion 256 of the slots 252 may lock the axial position of the mold collar 240 relative to the fitting, thereby locking the mold body 202 against the panel surface 102 after which sealant 402 may be injected into the mold cavity 222. After curing of the sealant 402, the mold collar 240 may be axially moved in the second axial direction and rotated in the second rotational direction in reverse order to the installation procedure described above, and resulting in the mold collar 240 drawing the mold body 202 away from the panel to expose the seal.

FIG. 34 shows an example of a seal molding system in which the mold collar engagement elements 243 are configured as a plurality of posts 250 protruding radially inwardly and the fitting engagement elements 117 are configured as a plurality of helically oriented slots 252 each having a helical portion 254 and a radial portion 256. Although the slots 252 in FIG. 34 are oriented such that counterclockwise rotation of the mold collar 240 urges the mold body 202 toward the panel 100, and clockwise rotation draws the mold body 202 away from the panel 100, the installation of the mold collar 240 and mold body 202 onto the fitting and their removal from the fitting is generally the same as in the above-described example shown in FIG. 33.

FIG. 35 shows an example of a seal molding system in which the slots 252 in the fitting 110 include an axial portion 258 and a radial portion 256. Installation of the mold collar 240 and mold body 202 onto a fitting 110 initially requires pure axial motion along a first axial direction as the posts 250 of the mold collar 240 move along the axial portion 258 of the slots 252 in the fitting 110. The slots 252 are configured such that when the posts 250 reach the end of the axial portion 258 of the slots 252, the mold body perimeter edge 220 is in contact with the panel surface 102. The mold collar 240 may then be rotated a short distance in a first rotational direction as the posts 250 move within a radial portion 256 of the slots 252 until reaching a terminal end of the slots 252. As described above, the radial portion 256 of the slots 252 axially locks the mold body 202 in position against the panel surface 102 after which sealant 402 may be injected into the mold cavity 222. Sealant may then be injected into the mold cavity and allowed to cure or harden to form a seal 400. Removal of the mold collar 240 and mold body 202 from the fitting 110 initially requires pure rotational motion along a second rotational direction (opposite the first rotational direction) as the posts 250 of the mold collar 240 move along the radial portion 256 of the slots 252 in the fitting 110. When the posts 250 reach the end of the radial portion 256 of the slots 252, the mold collar 240 is axially moved along the second axial direction opposite the first axial direction which simultaneously draws the mold body 202 away from the panel 100. In an alternative embodiment of the seal molding system 200 not shown, slots 252 with axial portions 258 may be formed in the mold collar 240, and posts 250 may be included with the fitting 110.

Figure 36:
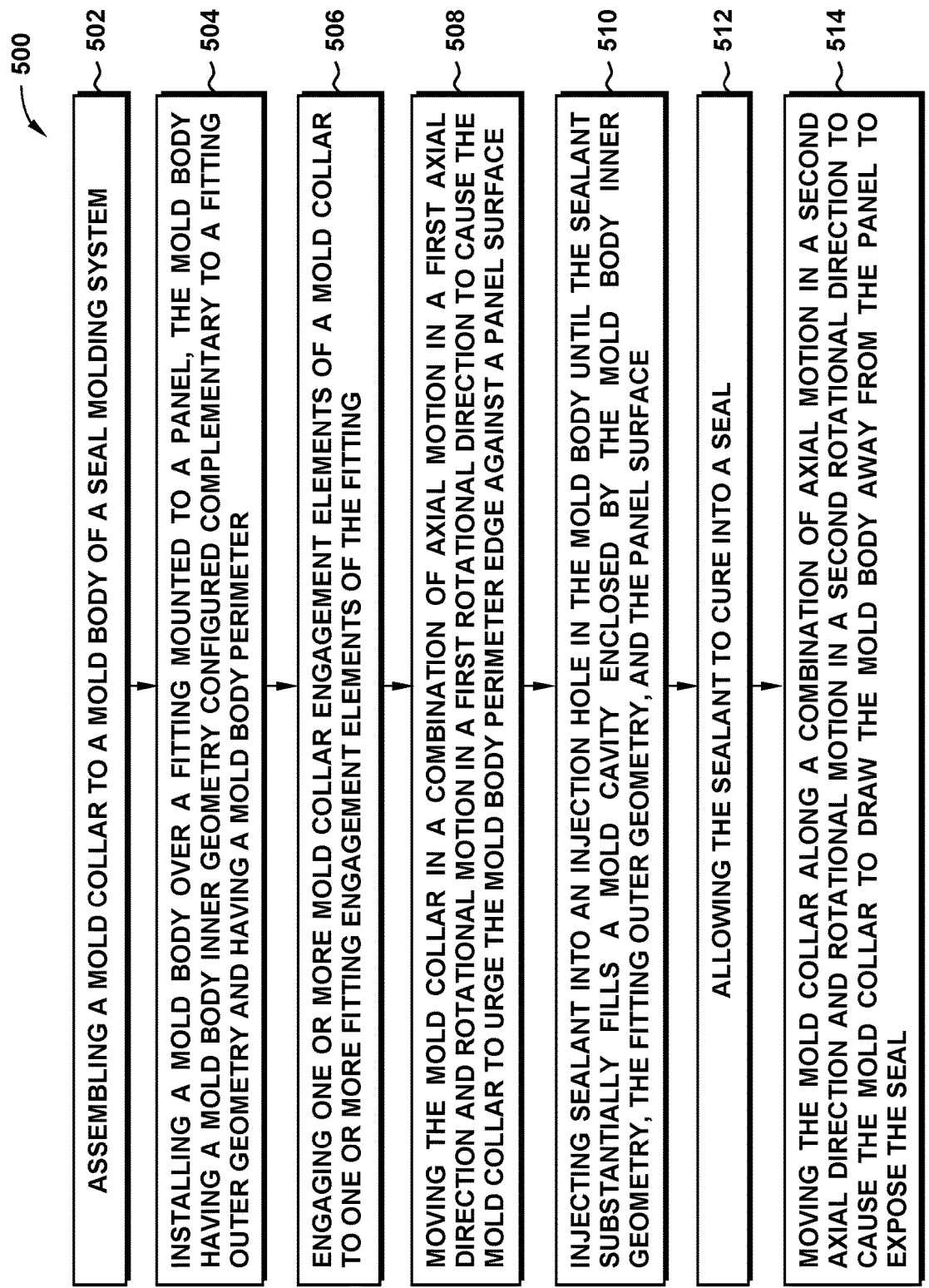
FIG. 36 is a flow diagram of a method of forming a seal around a fitting mounted to a panel.

FIG. 36 is a flow diagram of a method 500 of forming a seal 400 around a fitting 110 mounted to a panel 100. Step 502 of the method 500 includes coupling the mold collar 240 to the mold body 202 at the body-collar interface 260 (e.g., FIGS. 13, 28-30, 32). For examples of the seal molding system 200 (e.g., FIGS. 20-32) in which the mold body 202 has a plurality of axially extending tabs 264 having an inner diameter that is approximately the same diameter of the fitting body 126, it may be necessary to assemble the mold collar 240 to the mold body 202 prior to installing the mold body 202 over the fitting body 126 in order to provide room for the axially extending tabs 264 of the mold body 202 to radially deflect and thereby axially pass over the radial lip 230 of the ring flange 262 of the mold collar 240. However, in other examples, it may be possible to assemble the mold collar 240 to the mold body 202 after the mold body 202 is mounted on the fitting body 126. As mentioned above, in some examples of the seal molding system 200, the radial lips 230 of the mold body 202 and/or the radial lips 266 of the mold collar 240 may have ramped surfaces 268 to facilitate assembly of the mold collar 240 to the mold body 202 by allowing the radial lip 266 of the mold collar 240 to gradually move over the radial lip 230 of the mold body 202.

Step 504 of the method 500 includes installing a mold body 202 over the fitting 110 mounted to the panel 100. As described above, the mold body 202 has a mold body inner geometry 210 configured complementary to the fitting outer geometry 130 of the fitting 110. In addition, the mold body 202 has a mold body perimeter edge 220 that may be configured complementary to the panel surface 102 of the panel 100. For examples of the seal molding system 200 in which the mold body 202 is installed on the fitting 110 prior to assembly of the mold collar 240 to the mold body 202, the method may include positioning the mold body perimeter edge 220 against the panel surface 102. Positioning the mold body perimeter edge 220 against the panel surface 102 may include enclosing a plurality of fastener heads 138 within the mold cavity 222. The fastener heads 138 may be part of the flange fasteners 136 that secure the fitting flange 134 to the panel 100. As shown in the figures, the plurality of flange fasteners 136 may be located at spaced intervals around the circumference of the fitting body 126 (e.g., FIGS. 1-5) for securing the fitting flange 134 to the panel 100. In the presently-disclosed examples, the fitting flange 134 is shown mounted on the back side 106 of the panel 100 opposite the side on which the fitting threaded portion 116 is located. However, in other examples not shown, the fitting flange 134 may be mounted on the front side 104 of the panel 100 and the mold body inner geometry 210 may be provided in a size (e.g., a width and/or height) such that the perimeter edge (not shown) of the fitting flange 134 is enclosed within the mold cavity 222.

Step 506 of the method 500 includes engaging one or more mold collar engagement elements 243 of the mold collar 240 to one or more fitting engagement elements 117 of the fitting 110. For embodiments of the seal molding system 200 (e.g., FIGS. 5-32) in which the mold collar engagement element 243 is a mold collar threaded portion 244 and the fitting engagement element 117 is a fitting threaded portion 116, step 506 comprises threadably engaging the mold collar threaded portion 244 to the fitting threaded portion 116. For embodiments of the seal molding system 200 shown in FIGS. 33-35, step 506 comprises engaging a plurality of posts 250 of either the mold collar 240 or fitting 110 to a corresponding plurality of slots 252 of a remaining one of the mold collar 240 and fitting 110. For the seal molding system 200 example of FIG. 33, step 506 comprises engaging a plurality of slots 252 of the mold collar 240 to a corresponding plurality of posts 250 of the fitting 110 as described above. For the seal molding system 200 example of FIG. 34-35, step 506 comprises engaging a plurality of posts 250 of the mold collar 240 to a corresponding plurality of slots 252 of the fitting 110. For examples where the mold collar 240 is already coupled to the mold body 202 during installation onto the fitting 110, engaging one or more mold collar engagement elements 243 to one or more fitting engagement elements 117 may occur simultaneous with the above-described step 504 of installing the mold body 202 over the fitting 110. As described above, for the seal molding system 200 in the assembled state, the mold collar 240 is coupled to the mold body 202 at the body-collar interface 260 which is configured to retain the mold collar 240 with the mold body 202 and allow free rotation of the mold collar 240 relative to the mold body 202 during rotation of the mold collar 240 relative to the fitting 110.

Step 508 of the method 500 includes moving the mold collar 240 in a combination of axial motion in a first axial direction and rotational motion in a first rotational direction to cause the mold collar 240 to urge the mold body perimeter edge 220 against a panel surface 102. For embodiments of the seal molding system 200 of FIGS. 5-32 in which the mold collar engagement element 243 is a mold collar threaded portion 244 and the fitting engagement element 117 is a fitting threaded portion 116, step 508 comprises rotating the mold collar 240 in a first rotational direction relative to the fitting threaded portion 116 with simultaneous axial motion of the mold collar 240 in the first axial direction, and causing the mold collar 240 to urge the mold body perimeter edge 220 against the panel surface 102. For the seal molding system 200 of FIGS. 33-34 in which the fitting engagement elements 117 comprise either a plurality of posts 250 or a plurality of slots 252, and the mold collar engagement elements 243 comprise either a plurality of slots 252 or a plurality of posts 250 configured to respectively engage the plurality of posts 250 or slots 252 of the fitting 110, step 508 comprises moving the posts 250 along a helical portion 254 of the slots 252 in a first rotational direction, followed by rotating the posts 250 along a radial portion 256 of the slots 252. For the seal molding system 200 of FIG. 35, step 508 comprises moving the posts 250 along an axial portion 258 of the slots 252 followed by rotating the posts 250 in a first rotational direction along a radial portion 256 of the slots 252.

The step 508 of moving the mold collar 240 in a combination of axial motion in the first axial direction and rotational motion in the first rotational direction includes urging the bearing surface 270 of the mold collar 240 against the bearing surface 270 of the mold body 202. As described above, the mold collar 240 and mold body 202 each have a bearing surface 270 configured to bear against each other during rotation of the mold collar 240 in the first rotational direction. For the seal molding system 200 shown in FIG. 15, the mold body 202 includes a bearing surface 270 on the axially outermost surface of the radial lip 230 of the mold body 202, and the mold collar 240 has a groove upper wall 246 that functions as the bearing surface 270 for the mold collar 240. For the seal molding system 200 shown in FIGS. 28-29, the mold body base portion 218 functions as the bearing surface 270 and the axially outermost surface of the ring flange 262 of the mold collar 240 functions as the bearing surface 270 for the mold collar 240. As may be appreciated, the mold collar 240 and mold body 202 may respectively have bearing surfaces 270 in any one a variety of alternative configurations.

Referring briefly to FIG. 16, prior to or during step 508 of rotating the mold collar 240 in the first rotational direction, the method 500 may additionally include adjusting the clocking orientation of the mold body 202 until the injection hole 226 or the vent hole 228 is centered on a fastener head 138 (or fastener receptacle 140) of a flange fastener 136. As mentioned above, the mold body 202 may be configured such that the injection hole 226 and/or the vent hole 228 is centered on a fastener head 138 when the clocking orientation of the mold body 202 results in substantially equal thicknesses of the seal 400 on the lateral opposite sides of each fastener head 138. Referring briefly FIG. 17, for examples of the seal molding system 200 in which the mold body inner geometry 210 includes a plurality of depressions 224, adjusting the clocking orientation of the mold body 202 may result in alignment of the plurality of depressions 224 respectively with the locations of the plurality of flange fasteners 136.

Referring briefly to FIGS. 31-32, shown is an example of a body-collar interface 260 in which the mold body 202 includes an annular projection 216 having a generally radially inwardly facing bearing surface 270 oriented at an angle relative to the mold axis 204, and the mold collar 240 ring flange 262 has a generally radially outwardly facing bearing surface 270 that is angled complementary to the bearing surface 270 of the mold body 202. In such an arrangement, the step 508 of rotating the mold collar 240 in the first rotational direction may further include urging the bearing surface 270 of the ring flange 262 against the bearing surface 270 of the annular projection 216. As a result of the angled geometry of the bearing surface 270 of the mold body 202 and the bearing surface 270 of the mold collar 240, the method includes generating a body-collar compression force 300 on the annular projection 216 in response to urging the bearing surface 270 of the mold collar 240 against the bearing surface 270 of the mold body 202. The method further includes urging, via a radial force component 302 of the body-collar compression force 300, the annular projection 216 radially inward against the fitting body 126, and urging, via an axial force component 304 of the body-collar compression force 300, the mold body perimeter edge 220 against the panel surface 102. As described above, the radial force component 302 advantageously forces the annular projection 216 against the fitting body 126 to reduce or close an annular gap (not shown) through which sealant 402 may otherwise escape during injection of sealant 402 into the mold cavity 222. The axial force component 304 advantageously forces the mold body perimeter edge 220 against the panel surface 102 to reduce or prevent the escape of sealant 402 through a gap (not shown) that may otherwise occur between the mold body perimeter edge 220 and the panel surface 102.

Step 510 of the method 500 includes injecting sealant 402 into the injection hole 226 in the mold body 202 until the sealant 402 substantially fills the mold cavity 222. In the presently illustrated examples of the seal molding system 200, the mold cavity 222 is enclosed by the mold body inner geometry 210, the fitting outer geometry 130, the panel surface 102 and may additionally enclose the fastener heads 138 that may protrude above the panel surface 102. The method may further include stopping the injection of sealant 402 into the injection hole 226 when sealant 402 flows out of the vent hole 228 formed in the mold body 202. Sealant 402 flowing out of the vent hole 228 may indicate that the sealant 402 has substantially filled the volume of the mold cavity 222. As mentioned above, the vent hole 228 may also allow air to escape from the mold cavity 222 during the injection of sealant 402 into the injection hole 226. In some examples, the sealant 402 may be provided as a one-part sealant. However in other examples, the seal 400 may be provided as a two-part sealant including a resin and a hardener which may be premixed immediately prior to injection into the injection hole 226.

Step 512 of the method 500 includes allowing the sealant 402 to cure inside the mold cavity 222. Step 514 of the method 500 includes moving the mold collar 240 in a combination of axial motion in a second axial direction and rotational motion in a second rotational direction opposite the first rotational direction to cause the mold collar 240 to draw the mold body 202 away from the panel surface 102 to expose the seal 400. For embodiments of the seal molding system 200 of FIGS. 5-32 in which the mold collar engagement element 243 is a mold collar threaded portion 244 and the fitting engagement element 117 is a fitting threaded portion 116, step 514 comprises rotating the mold collar 240 in the second rotational direction relative to the fitting threaded portion 116. For embodiments of the seal molding system 200 of FIGS. 33-35 in which the fitting engagement elements 117 comprise either a plurality of posts 250 or slots 252, and the mold collar engagement elements 243 comprise either a plurality of slots 252 or posts 250 configured to respectively engage the posts 250 or slots 252 of the fitting 110, step 514 comprises rotating the mold collar 240 in the second rotational direction until the posts 250 are moved out of the radial portion 256 of the slots 252, after which the posts 250 are moved along the helical portion 254 (FIGS. 33-34) or axial portion 258 (FIG. 35) of the slots 252 until the mold body 202 and mold collar 240 are removed from the fitting 110.

Referring briefly to FIG. 15, rotating the mold collar 240 in the second rotational direction includes axially engaging the radial lip 266 of the mold collar 240 with the radial lip 230 of the mold body 202 in response to rotating the mold collar 240 in the second rotational direction. As described above, the radial lip 266 of the mold collar 240 is part of either a ring flange 262 of the mold collar 240, or part of a plurality of axially extending tabs 264 of the mold collar 240. Likewise, the radial lip 230 of the mold body 202 is part of either a ring flange 262 of the mold body 202 or part of a plurality of axially extending tabs 264 of the mold body 202. For the example of the seal molding system 200 shown in FIGS. 5-19, axially engaging the radial lip 266 of the mold collar 240 with the radial lip 230 of the mold body 202 includes axially engaging the inwardly protruding radial lip 266 of the axially extending ring flange 262 of the mold collar 240 with the outwardly protruding radial lip 230 of the axially extending ring flange 262 of the mold body 202. For the example of the seal molding system 200 shown in FIGS. 20-29, axially engaging the radial lip 266 of the mold collar 240 with the radial lip 230 of the mold body 202 includes axially engaging the inwardly protruding radial lip 266 of the axially extending ring flange 262 of the mold collar 240 with the outwardly protruding radial lips 230 of the corresponding plurality of axially extending tabs 264 of the mold body 202.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A seal molding system for forming a seal around a fitting mounted to a panel, comprising:
   a mold body having a protruding mold body radial lip, and having a mold body inner geometry configured complementary to a fitting outer geometry of a fitting and having a mold body perimeter edge, the mold body comprising a mold body base portion having a mold body bore, and including one of:
      an axially extending mold body ring flange protruding from the mold body bore, the mold body radial lip extending circumferentially around the mold body ring flange, or
      a plurality of axially extending mold body tabs protruding from the mold body bore, each one of the mold body tabs having the mold body radial lip;
   a mold collar having a protruding mold collar radial lip, and having one or more mold collar engagement elements configured to engage with one or more fitting engagement elements of the fitting;
   the mold collar radial lip configured to interlock with the mold body radial lip at a body-collar interface in a manner causing the mold collar to be retained with the mold body, and allow free rotation of the mold collar relative to the mold body during engagement of the one or more mold collar engagement elements with the one or more fitting engagement elements;
   the mold collar radial lip and the mold body radial lip configured such that a combination of axial motion in a first axial direction and rotational motion in a first rotational direction of the mold collar relative to the fitting causes the mold collar to urge the mold body against a panel surface, and a combination of axial motion in a second axial direction and rotational motion in a second rotational direction of the mold collar relative to the fitting causes the mold collar to draw the mold body away from the panel; and
   the mold body having an injection hole for injecting sealant into a mold cavity collectively defined by the mold body inner geometry, the fitting outer geometry, and the panel surface.

2. The seal molding system of claim 1, wherein:
   the one or more fitting engagement elements comprise a fitting threaded portion; and
   the one or more mold collar engagement elements comprise a mold collar threaded portion configured to threadably engage the fitting threaded portion.

3. The seal molding system of claim 1, wherein:
   the one or more fitting engagement elements of the fitting comprise either a plurality of posts or a plurality of slots; and
   the one or more mold collar engagement elements of the mold collar comprise either a plurality of slots or a plurality of posts configured to respectively engage the plurality of posts or plurality of slots of the fitting.

4. The seal molding system of claim 1, wherein:
   the mold body and the mold collar each include a bearing surface at the body-collar interface; and
   the bearing surface of the mold collar configured to bear against the bearing surface of the mold body when the mold collar is rotated in the first rotational direction and/or axially moved in the first axial direction causing the mold collar to urge the mold body perimeter edge against the panel surface.

5. The seal molding system of claim 1, wherein:
the mold collar includes one of an axially extending mold collar ring flange or a plurality of axially extending mold collar tabs;
the mold collar ring flange and the plurality of axially extending mold collar tabs each including the mold collar radial lip; and
the mold body radial lip configured to axially engage the mold collar radial lip when the mold collar is rotated in the second rotational direction and/or moved in the second axial direction, causing the mold collar to draw the mold body away from the panel.

6. The seal molding system of claim 5, wherein:
the mold body includes the axially extending mold body ring flange having the mold body radial lip, which protrudes outwardly; and
the mold collar radial lip protrudes inwardly, the inwardly protruding mold collar radial lip is configured to engage with the outwardly protruding mold body radial lip.

7. The seal molding system of claim 5, wherein:
the mold body includes the plurality of axially extending mold body tabs each having the mold body radial lip; and
the mold collar radial lip protrudes inwardly, the inwardly protruding mold collar radial lip is configured to engage with the outwardly protruding mold body radial lip.

8. The seal molding system of claim 5, wherein:
the fitting has a fitting body protruding through a panel hole in the panel;
the mold body includes an annular projection having a bearing surface that is annular and generally radially outwardly facing and oriented non-perpendicular to a mold axis of the mold body;
the mold collar having a bearing surface that is annular and generally radially inwardly facing and oriented non-perpendicular to the mold axis and configured to engage the bearing surface of the mold body for generating a body-collar compression force on the annular projection when the mold collar is rotated in the first rotational direction and/or axially moved in the first axial direction;
the bearing surface of the mold body and mold collar being oriented in a manner causing a radial force component and an axial force component of the body-collar compression force to be generated;
the radial force component urging the annular projection radially inwardly against the fitting body; and
the axial force component urging the mold body perimeter edge against the panel surface.

9. The seal molding system of claim 1, wherein:
the fitting has a fitting body protruding through a panel hole in the panel; and
the mold body inner geometry is configured to encapsulate fastener heads of a plurality of flange fasteners located around a circumference of the fitting body.

10. The seal molding system of claim 1, wherein:
the mold body is configured such that the injection hole is centered on a flange fastener when a clocking orientation of the mold body results in an equal gap between the mold body inner geometry and lateral sides of the flange fasteners.

11. The seal molding system of claim 1, wherein:
the fitting is secured to the panel by a plurality of flange fasteners; and
the mold body inner geometry includes a plurality f depressions positioned in correspondence to the plurality of flange fasteners.

12. A seal molding system for forming a seal around a fitting mounted to a panel, comprising:
a mold body having a protruding mold body radial lip, and having a mold body inner geometry configured complementary to a fitting outer geometry of a fitting and having a mold body perimeter edge, the mold body comprising a mold body base portion having a mold body bore, and including one of:
an axially extending mold body ring flange protruding from the mold body bore, the mold body radial lip extending circumferentially around the mold body ring flange, or
a plurality of axially extending mold body tabs protruding from the mold body bore, each one of the mold body tabs having the mold body radial lip;
a mold collar having a protruding mold collar radial lip, and having a mold collar threaded portion configured to be threadably engaged to a fitting threaded portion of the fitting;
the mold collar radial lip configured to interlock with the mold body radial lip at a body-collar interface in a manner causing the mold collar to be retained with the mold body, and allow free rotation of the mold collar relative to the mold body during rotation of the mold collar threaded portion relative to the fitting threaded portion;
the mold collar radial lip and the mold body radial lip configured such that when the mold collar is rotated in a first rotational direction and/or axially moved in a first axial direction, the mold collar urges the mold body against a panel surface, and when the mold collar is rotated in a second rotational direction and/or axially moved in a second axial direction, the mold collar draws the mold body away from the panel; and
the mad body having an injection hole for infecting sealant into a mold cavity collectively defined by the mold body inner geometry, the fitting outer geometry, and the panel surface.

13. A method of forming a seal around a fitting mounted to a panel, comprising:
installing a mold body on a fitting, the mold body having a protruding mold body radial lip, and having a mold body inner geometry configured complementary to a fitting outer geometry of a fitting and having a mold body perimeter edge, the mold body comprising a mold body base portion having a mold body bore, and including one of:
an axially extending mold body ring flange protruding from the mold body bore, the mold body radial lip extending circumferentially around the mold body ring flange, or
a plurality of axially extending mold body tabs protruding from the mold body bore, each one of the mold body tabs having the mold body radial lip;
engaging one or more mold collar engagement elements of a mold collar to one or more fitting engagement elements of the fitting, the mold collar having a protruding mold collar radial lip;
interlocking the mold body radial lip with the mold body radial lip at a body-collar interface, and thereby causing the mold collar to be retained with the mold body, and allowing free rotation of the mold collar relative to the mold body during engagement of the one or more mold collar engagement elements with the one or more fitting engagement elements;

moving the mold collar in a combination of axial motion in a first axial direction and rotational motion in a first rotational direction to cause the mold collar to urge the mold body perimeter edge against a panel surface;

injecting sealant into an injection hole in the mold body for filling a mold cavity enclosed by the mold body inner geometry, the fitting outer geometry, and the panel surface;

allowing the sealant to cure into a seal; and moving the mold collar in a combination of axial motion in a second axial direction and rotational motion in a second rotational direction to cause the mold collar to draw the mold body away from the panel to expose the seal.

14. The method of claim 13, wherein the step of engaging the or more mold collar engagement elements of the mold collar to the one or more fitting engagement elements of the fitting comprises:

threadably engaging a mold collar threaded portion of the mold collar to a fitting threaded portion of the fitting.

15. The method of claim 13, wherein the step of engaging the one or more mold collar engagement elements of the mold collar to the one or more fitting engagement elements of the fitting comprises:

engaging a plurality of posts of either the mold collar or fitting to a corresponding plurality of slots of a remaining one of the mold collar and fitting.

16. The method of claim 13, further including:

interlocking the mold body radial lip with the mold body radial lip prior to installing the mold body over the fitting.

17. The method of claim 13, wherein the step of moving the mold collar in a combination of axial motion in the first axial direction and rotational motion in the first rotational direction includes:

urging a bearing surface of the mold collar against a bearing surface of the mold body in response to axially moving the mold collar in the first axial direction and/or rotating the mold collar in the first rotational direction.

18. The method of claim 13, wherein the step of moving the mold collar in a combination of axial motion in the second axial direction and rotational motion in the second rotational direction includes:

axially engaging u the mold collar radial lip of with the mold body radial lip in response to axially moving the mold collar in the second axial direction and/or rotating the mold collar in the second rotational direction; and the radial lip of at least one of the mold collar and the mold body being included with one of an axially extending ring flange and a plurality of axially extending tabs.

19. The method of claim 18, wherein axially engaging the mold collar radial lip with the mold body radial lip comprises:

axially engaging an inwardly protruding mold collar radial lip of an axially extending mold collar ring flange with an outwardly protruding mold body radial lip of an axially extending mold body ring flange.

20. The method of claim 18, wherein axially engaging the mold collar radial lip with the mold body radial lip comprises:

axially engaging an inwardly protruding mold collar radial lip of an axially extending mold collar ring flange with outwardly protruding mold body radial lips of a corresponding plurality of axially extending mold body tabs.

21. The method of claim 18, step of moving the mold collar in a combination of axial motion in the first axial direction and rotational motion in the first rotational direction includes:

urging a generally radially inwardly facing bearing surface of an annular projection of the mold body against a generally radially outwardly facing bearing surface of an axially extending mold collar ring flange of the mold collar, a bearing surface of the mold body and a bearing surface of the mold collar being oriented non-perpendicular to a mold axis;

generating a body-collar compression force on the annular projection in response to urging the bearing surface of the mold body against the bearing surface of the mold collar;

urging, via a radial force component of the body-collar compression force, the annular projection radially inward against a fitting body of the fitting; and urging, via an axial force component of the body-collar compression force, the mold body perimeter edge against the panel surface.

22. The method of claim 13, further including:

enclosing fastener heads of a plurality of flange fasteners within the mold cavity.

23. The method of claim 13, further including:

adjusting a clocking orientation of the mold body until the injection hole is centered on one of a plurality of flange fasteners securing a fitting flange to the panel.

24. The method of claim 13, wherein:

the mold body inner geometry includes a plurality of depressions located in correspondence to a plurality of flange fasteners securing a fitting flange to the panel.

* * * * *